US011088890B1

(12) United States Patent
Bench et al.

(10) Patent No.: US 11,088,890 B1
(45) Date of Patent: Aug. 10, 2021

(54) VIDEO INSPECTION SYSTEMS AND METHODS USING SELF-SYNCHRONIZING QAM

(71) Applicant: SeeScan, Inc., San Diego, CA (US)

(72) Inventors: Stephanie M. Bench, Carlsbad, CA (US); Roger B. Shaffer, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 16/030,694

(22) Filed: Jul. 9, 2018

Related U.S. Application Data

(63) Continuation of application No. 15/425,785, filed on Feb. 6, 2017, now Pat. No. 10,027,526, which is a continuation of application No. 12/715,684, filed on Mar. 2, 2010, now Pat. No. 9,571,326.

(60) Provisional application No. 61/157,884, filed on Mar. 5, 2009.

(51) Int. Cl.
*H04L 23/02* (2006.01)
*H04L 27/36* (2006.01)
*H04L 27/38* (2006.01)
*H04L 27/34* (2006.01)

(52) U.S. Cl.
CPC ........ *H04L 27/362* (2013.01); *H04L 27/3455* (2013.01); *H04L 27/3818* (2013.01)

(58) Field of Classification Search
CPC .............. H04L 27/362; H04L 27/3455; H04L 27/3818
USPC .................. 375/261; 348/507; 370/255, 389; 714/792
See application file for complete search history.

(56) References Cited

U.S. PATENT DOCUMENTS 3,813,598 A 5/1974 Stuart
3,849,730 A 11/1974 Ho
4,574,244 A 3/1986 Head
(Continued)

FOREIGN PATENT DOCUMENTS

GB 0 752 185 B1 7/2002

OTHER PUBLICATIONS

Altera, "Versatile Digital QAM Modulator," White Paper, 2005, Entire Document, Version 1.1, Altera Corporation, San Jose, CA, USA.

(Continued)

*Primary Examiner* — Jayanti K Patel
*Assistant Examiner* — Richard B Carter
(74) *Attorney, Agent, or Firm* — Steven C. Tietsworth, Esq.; Michael J. Pennington, Esq.

(57) ABSTRACT

Methods and apparatus for wired communications are disclosed. A method for transmitting a data stream through a wired communications channel includes encoding the data stream to produce a first baseband modulating signal I(t) and a second baseband modulating signal Q(t) whose amplitudes together represent a time series of complex symbols (I, Q) each selected from a two-dimensional (2-D) constellation of symbols distributed on the phase plane about the origin such that at least one of the baseband modulating signals has a substantially non-zero mean amplitude, modulating the baseband signals I(t) and Q(t) to produce a modulated signal, wherein the I(t) and Q(t) components of the modulated signals are generally fixed in quadrature, and providing the modulated signal to a wired communications channel.

9 Claims, 15 Drawing Sheets

(56) References Cited

U.S. PATENT DOCUMENTS

| | | | |
|---|---|---|---|
| 4,987,375 A | 1/1991 | Wu | |
| 5,495,203 A | 2/1996 | Harp | |
| 5,528,195 A | 6/1996 | Lu | |
| 5,598,435 A | 1/1997 | Williams | |
| 5,894,334 A | 4/1999 | Strolle | |
| 5,966,412 A | 10/1999 | Ramaswamy | |
| 5,995,168 A * | 11/1999 | Yagi | H04N 5/211 348/507 |
| 6,359,525 B1 | 3/2002 | Mohan | |
| 6,493,409 B1 | 12/2002 | Lin | |
| 6,934,317 B1 | 8/2005 | Dent | |
| 7,263,130 B1 | 8/2007 | Mitlin | |
| 7,263,144 B2 | 8/2007 | Sasson | |
| 7,283,599 B1 | 10/2007 | Herbig | |
| 8,239,728 B1 * | 8/2012 | Moon | G06F 11/1012 714/755 |
| 2005/0002465 A1 * | 1/2005 | Jeong | H04L 27/38 375/261 |
| 2006/0085727 A1 * | 4/2006 | Azenkot | H04L 5/02 714/792 |
| 2007/0081475 A1 * | 4/2007 | Telado | H04L 1/0003 370/255 |
| 2007/0204205 A1 | 8/2007 | Niu | |
| 2008/0002789 A1 | 1/2008 | Jao | |
| 2008/0317168 A1 | 12/2008 | Yang | |
| 2009/0044083 A1 | 2/2009 | Azenkot | |
| 2009/0147839 A1 | 6/2009 | Grenabo | |
| 2010/0020794 A1 * | 1/2010 | Cholas | H04N 7/17318 370/389 |

OTHER PUBLICATIONS

Citta, Richard et al, "ATSC Transmission System: VSB Tutorial," Montreuz Symposium Handout, Jun. 12, 1997, pp. 8-9, Zenith Electronics Corporation, USA.

Farhang-Boroujeny et al, Cosine Modulated and Offset QAM Filter Bank Multicarrier Techniques: A Continuous-Time Prospect, Academic Paper, Entire Document, ECE Department, University of Utah, USA.

Hyun, S. K. er al, "Interleaved 5B20 Code for Insertion of Carrier and Clock Pilots in 64-QAM Systems," Electronics Letters, Aug. 29, 1991, pp. 1635-1636, vol. 27, No. 18, Department of Electrical Engineering, Korea Advanced Institute of Science and Technology, Seoul, Korea.

Liu, Qijia et al, "A Novel QAM Joint Frequency-Phase Carrier Recovery Method," Academic Paper, IEEE Xplore Digital Library, Feb. 20, 2006, pp. 1617-1621, Department of Electrical Engineering, Tsinghua University, Beijing, P.R.China.

O'Hara, Sean T. et al, "Orthogonal-Coded Selective Mapping (OCSM) for OFDM Peak-To-Average Power Reduction Wthout Side Information," SDR 04 Technical Conference and Product Exposition, 2004, Systems Technology Center, Syracuse Research Corporation, Syracuse, NY, USA.

Sparano, David, "What Exactly Is 8-VSB Anyway?" Tutorial Article, 1997, Harris Corporation Broadcast website, Quincy, Illinois, USA.

Tariq, M. Fahim, et al, "Efficient Implementation of Pilot-Aided 32 QAM for Fixed Wireless and Mobile ISDN Applications," Academic Paper, 2000, UK.

Tariq, M. Fahim, et al, "Performance Comparison of Pilot Tone Aided and Pilot Symbol Aided QAM over a Mobile Radio Channel," Academic Paper, 2000, UK.

Williams, Thomas H., "Pilot-Assisted Frequency Domain Reciprocal Modulation for Microwave Channels with Dynamic Multipath," IEEE 802.16 Broadband Wireless Access Working Group, Oct. 29, 1999, Longmont, CO, USA.

Yamanaka, Kazuya et al, "A Multi-Level QAM Demodulator LSI with Wideband Carrier Recovery and Dual Equalizing Mode," Scientific Paper, System LSI Laboratory, Mitsubishi Electric Corporation, Hyogo, Japan.

* cited by examiner

VIDEO INSPECTION SYSTEMS AND METHODS USING SELF-SYNCHRONIZING QAM

CROSS-REFERENCES TO RELATED APPLICATIONS

This application is a continuation of and claims priority to co-pending U.S. Utility patent application Ser. No. 12/715,684, filed on Mar. 2, 2010, which claims priority under 35 U.S.C. § 119(e) to U.S. Provisional Application No. 61/157,884, filed on Mar. 5, 2009. The content of each of these applications is hereby incorporated by reference herein in its entirety for all purposes.

This application is also related to U.S. patent application Ser. No. 12/399,859 filed Mar. 6, 2009, by Mark S. Olson et al., entitled "Pipe Inspection System with Selective Image Capture," the entire disclosure of which is hereby incorporated by reference.

BACKGROUND OF THE INVENTION

1. Field of the Invention

This invention relates generally to electronic information transfer systems and more particularly to a communication system for transferring data in a pipe inspection system.

2. Description of the Related Art

Analog and digital Quadrature Amplitude Modulation (QAM) methods for amplitude modulating two symbol clocks phase-locked in quadrature have been known and used since the early days of signal processing and are widely used today. For example, analog QAM is used to transfer the chroma component information in the 1953 National Television System Committee (NTSC) and the 1963 Phase Alternating Line (PAL) standard television signals and a 1977 Compatible QAM variation (C-QUAM) is still used to transfer the stereo difference information in some AM stereo radio signals. More recently, a variety of digital QAM schemes (quantized QAM) were adapted for widespread use in cellular systems and for other wireless applications, including the WiMAX and Wi-Fi 802.11 standards.

Advantageously, digital QAM may be configured with Amplitude-Shift Keying (ASK) to provide many data bits per symbol and thereby increase data transfer rates in a channel without increasing Inter-Symbol Interference (ISI). Amplitude modulating two symbol clocks in quadrature (QAM) can be equivalently viewed as both amplitude modulating and phase modulating a single symbol clock and each such modulation value (amplitude and phase) can be represented as a single point (symbol) on the phase plane diagram, as is well-known in the art. For example, by using two distinct amplitudes and four phase sin states for each of these amplitudes, a single symbol clock cycle can serve to carry one symbol having eight states; equivalent to three bits of information. In this example, a 5 MHz channel baseband can transfer data at 15 Mb/s at the expense of requiring a more robust method for reducing the impact of noise and increasing the Signal-to-Noise Ratio (SNR) to permit recovery of the significantly higher number of discrete signal amplitudes involved in each symbol clock cycle.

Proper separation of the I(t) and Q(t) quadrature components of a digital or analog QAM signal requires the coherent demodulator signal phase at the receiver to be exactly in phase with the received QAM signal carrier. Even a small demodulating phase error introduces crosstalk between the I(t) and Q(t) quadrature components recovered from a digital or analog QAM signal. Both symbol clock and carrier recovery systems in a receiver attempt to derive information about timing from the received signal, often in a similar manner. While carrier recovery is only necessary in a coherent demodulation system, symbol clock recovery is required in all schemes, and accurate clock recovery is essential for reliable data transmission. Confusion often exists between clock and carrier recovery. Clock recovery attempts to synchronize the receiver clock with the baseband symbol rate transmitter clock, whereas carrier recovery attempts to align the receiver local oscillator with the transmitted carrier frequency.

Thus, symbol clock synchronization at the receiver must be handled somehow in any QAM system. Any phase and frequency variations introduced by the channel must be removed at the receiver by properly tuning the sine and cosine components of the local QAM demodulator, which requires a local symbol clock phase reference that is typically provided by some useful version of a local Phase-Locked Loop (PLL). But this local phase reference must somehow be synchronized with the received QAM signal symbol clock. For example, early analog QAM television systems transmit a burst of the color subcarrier after each horizontal synchronization pulse for local clock phase reference synchronization.

The QAM art has evolved in various ways to increase throughput and reliability. A typical QAM data communication system includes a transmitter, a receiver, and an unknown time-invariant channel in which a complex-valued sequence of input data representing a series of symbols selected from a complex symbol alphabet (also denominated a "constellation" on the complex I-Q plane or "phase plane") are sent through the channel to be interpreted by the receiver. Conventional QAM systems assume that channel noise is independent of input data and relatively stationary. Some distortion of the transmitted signal is typical of non-ideal channel media including wired and wireless connections.

The QAM demodulator is by far the most complex element of the QAM system. The demodulator must detect the phase and amplitude of the received signal, decode each symbol based on the phase and amplitude of the baseband symbol clock and then finally convert the symbol data back to a serial stream. The baseband symbol clock must be recovered to complete the symbol demodulation. Clock recovery is a recurring problem with any digital signal processing system.

The QAM art is replete with improvements intended to increase channel data transfer capacity while reducing receiver cost and complexity. There is an undesirable level of complexity and overhead in conventional QAM receivers for filtering signals and recovering baseband symbol clock synchronization. In applications where channel bandwidth is limited, such as pipe inspection system channels with a handful of hard-wired conductors, additional problems include correcting for a variable-length copper channel and limiting camera-end hardware complexity to facilitate the small package size necessary for movement inside pipes.

Practitioners in the art have proposed a wide variety of methods simplifying the QAM carrier and clock recovery problem. For example, in U.S. Publ. Appl. No. 2009/0,147,839 A1, Grenabo discloses an improved phase error detector for a QAM receiver but neither considers nor suggests any symbol constellation adjustments. Similarly, in U.S. Pat. No. 7,283,599 B1, Herbig discloses an improved phase error detector for a QAM receiver suitable for improving phase locking characteristics but neither considers nor suggests using an asymmetric symbol constellation. And, in U.S. Pat. No. 4,987,375, Wu et al. disclose a carrier lock detector for a QAM system employing symbol detection ratios and useful for improved reliability at low SNR but neither consider nor suggest any symbol constellation adjustments.

Practitioners in the art have also proposed a wide variety of methods for improving QAM system performance through manipulation of the symbol constellations. For example, in U.S. Publ, Appl. No. 2008/0,317,168 A1, Yang et al. disclose an integer spreading rotation technique for shaping symmetric QAM symbol constellations to enhance signal space diversity but neither consider nor suggest techniques for improving baseband symbol clock recovery at the receiver. These practitioners appear to firmly believe that the QAM symbol constellation must be as symmetric as possible about the phase plane origin to minimize the system Bit-Error Rate (BER).

Some practitioners have found certain slight asymmetries in the QAM symbol constellation to have some utility but have neither taught nor suggested using changes to the symbol constellation to improve baseband symbol clock recovery in QAM system receivers. For example, O'Hara et al. ("Orthogonal-Coded Selective Mapping (OCSM) For OFDM Peak-To-Average Power Reduction Without Side Information," *Proceeding of the SDR 04 Technical Conference and Product Exposition.* 2004) propose a selective mapping (SM) method for reducing peak-to-average power (PAP) in Orthogonal Frequency Division Multiplexing (OFDM) systems that is achieved by introducing a very small asymmetry to the QAM subcarrier constellations before scrambling. But O'Hara et al. take pains to point out that this does not mean that the QAM subcarrier constellations are no longer zero-mean over time because the subsequent antipodal scrambling process returns the subcarrier symbol constellations to zero-mean symmetry again before transmission.

Other practitioners have suggested using a pilot tone in a QAM channel to improve channel estimation. For example, Tariq et al. ("Efficient Implementation Of Pilot-Aided 32 QAM For Fixed Wireless And Mobile ISDN Applications," *Vehicle Tech. Conf. Proc.,* 2000, *VTC* 2000-*Spring Tokyo.* 2000 *IEEE* 51$^{st}$, Vol, 1, pp. 680-684) discloses an improved QAM system where agap is created in the center of the information bearing signal spectrum and a pilot tone inserted therein before transmission. Tariq et al. neither teach nor suggest that their pilot tone has any relationship to the QAM baseband symbol clock; in fact, they teach using the pilot tone at the receiver only for the purpose of channel estimation and compensation. In U.S. Pat. No. 3,813,598, Stuart discloses a pilot-tone aided QAM carrier recovery system that adds a pilot tone to the QAM transmission either above or below the QAM modulator output spectrum, which may be recovered and used to deduce channel distortion effects at the receiver, but Stuart neither considers nor suggests any manipulation of the symmetric QAM symbol constellation for baseband symbol clock recovery. In U.S. Pat. No. 6,493,490 B1, Lin et at disclose an improved phase detector for carrier recovery in a dual-mode QAM/VSB (Vestigial Sideband) receiver system. Lin et at discuss creating a pilot-tone aided Offset-QAM signal by first delaying the Q component by one half of a symbol, thereby offsetting the Q rail, in time, from information on the I rail, but neither consider nor suggest using an asymmetric QAM symbol constellation. Hyun et al, ("Interleaved 5820 Code For Insertion Of Carrier And Clock Pilots In 64-QAM Systems," *IEEE Electronics Letters*, Vol. 27, No. 18, pp. 1635-6, 29 Aug. 1991) disclose a method for selecting symbols from a symmetric diamond-shaped symbol constellation to introduce a spectral null at the Nyquist frequency, thereby permitting the detection of a low-power clock pilot signal inserted at the null frequency, but neither consider nor suggest using an asymmetric QAM symbol constellation.

SUMMARY OF THE INVENTION

This invention arises from the unexpectedly advantageous observation that operating a Quadrature Amplitude Modulation (QAM) transmitter modulator with at least one unbalanced mixer, which creates an asymmetric two-dimensional (2-D) QAM symbol constellation, provides baseband symbol clock signal leakage sufficient to facilitate quick and simple baseband symbol clock recovery at the QAM receiver without significantly degrading the system Bit-Error Rate (BER). In fact, the QAM method of this invention flattens the system BER curve to reduce the Signal-to-Noise Ratio (SNR) required to provide lower BERs by as much as several decibels (dB). This is a profound and completely unexpected observation that has advantageous applications in many QAM systems, including (without limitation) pipe inspection systems, cell phone systems, commercial broadcast systems, Wi-Fi systems and many others.

It is a purpose of this invention to provide QAM channel baseband symbol clock recovery that reduces the system BER, complexity and computational load in certain SNR regions.

It is an advantage of this invention that it may be extended to any system generally relying on QAM methods to encode a transmitted signal. More specifically, the QAM method of this invention may be adapted to improve the lower functional layers (the physical transmission, reception, media correction and timing recovery elements) in certain SNR regions of any data transmission and reception system using a variant of QAM or any of its derivatives that employ two-dimensional (2-D) symbol constellations, such as Orthogonal Frequency-Division Multiplexing (OFDM), Quotient Quadrature Amplitude Modulation (QAM), etc. Except for the improved BER in certain SNR regions, the QAM method of this invention does not affect the higher QAM system functional layers known in the art, such as forward error correction coding, symbol scrambling, symbol mapping, etc.

It is an advantage of this invention that the effects of the QAM channel characteristics can be automatically corrected at the receiver without additional receiver complexity or cost.

It is an advantage of this invention that, in a pipe inspection system with limited camera-transmitter space, the processing complexity is constrained to the QAM receiver, reducing space and complexity requirements for the camera-transmitter.

In one aspect, the invention is a method for transferring data through the signal channel including the steps of encoding the data to produce a first baseband modulating signal (t) and a second baseband modulating signal Q(t) whose amplitudes together represent a time series of complex symbols (I, Q) each selected from a two-dimensional (2-D) constellation of symbols distributed on the phase plane about the origin such that at least one of the baseband modulating signals has a substantially non-zero mean amplitude; multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature; summing the first and second modulation product signals to produce a transmitter output signal; coupling the transmitter output signal through the signal channel to the data receiver; and demodulating the first and second modulation product signals at the data receiver to recover the series of complex symbols (I, Q).

In another aspect, the invention is a communication system including a data transmitter having an input for accepting data, a Quadrature Amplitude Modulation (QAM) encoder coupled to the data input for producing, responsive to the data, a first baseband modulating signal I(t) and a second baseband modulating signal Q(t) whose amplitudes together represent a time series of complex symbols (I, Q) each selected from a two-dimensional (2-D) constellation of symbols distributed on the phase plane about the origin such that at least one of the baseband modulating signals has a substantially non-zero mean amplitude, a QAM modulator coupled to the QAM encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, and for summing the first and second modulation product signals to produce a transmitter output signal, and an output for coupling the transmitter output signal to a signal channel; and a data receiver having a signal input coupled to the signal channel for accepting the transmitter output signal, and a QAM demodulator coupled to the signal input for recovering the series of complex symbols (I, Q) from the first and second modulation product signals.

In yet another aspect, the invention is a data modulator for a video transmitter including an input for accepting data; a Quadrature Amplitude Modulation (QAM) encoder coupled to the data input for producing, responsive to the data, a first baseband modulating signal I(t) and a second baseband modulating signal Q(t) whose amplitudes together represent a time series of complex symbols (I, Q) each selected from a two-dimensional (2-D) constellation of symbols distributed on the phase plane about the origin such that at least one of the baseband modulating signals has a substantially non-zero mean amplitude; and a QAM modulator coupled to the QAM encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, and for summing the first and second modulation product signals to produce a transmitter output signal.

In one embodiment, the invention is a pipe inspection system including a video transmitter having a video camera adapted to produce video data, and a QAM modulator coupled to the video camera, including a symbol encoder for producing, responsive to the video data, a first baseband modulating signal $I_T(t)$ and a second baseband modulating signal $Q_T(t)$ whose amplitudes together represent a time series of complex transmitter symbols ($I_T$, $Q_T$) each selected from a two-dimensional (2-D) constellation of symbols distributed on the phase plane about the origin such that at least one of the baseband modulating signals has a substantially non-zero mean amplitude, a baseband symbol clock oscillator for producing first and second baseband symbol clock signals generally fixed in quadrature, a dual multiplier coupled to the symbol encoder and baseband symbol clock oscillator for multiplying the first baseband modulating signal $I_T(t)$ by the first baseband symbol clock signal to produce a first modulation product signal and for multiplying the second baseband modulating signal $Q_T(t)$ by the second baseband symbol clock signal to produce a second modulation product signal, a summer coupled to the dual multiplier for summing the first and second modulation product signals to produce a transmitter output signal, and a filter coupled to the summer for producing a filtered transmitter output signal; a mechanical cable assembly coupled to the video transmitter for urging the video transmitter through a pipe under inspection and including an electrical conductor coupled to the QAM modulator for accepting the filtered transmitter output signal; and a video receiver having a signal conditioner coupled to the electrical conductor for producing a baseband receiver input signal representing the filtered transmitter output signal, a QAM demodulator coupled to the signal conditioner, including a baseband symbol clock detector for detecting the first baseband symbol clock signal from the receiver input signal, a baseband symbol clock recovery oscillator coupled to the baseband symbol clock detector for producing a first recovered baseband symbol clock signal generally synchronized with the first baseband symbol clock signal and for producing a second recovered baseband symbol clock signal generally fixed in quadrature with the first recovered baseband symbol clock signal, a dual multiplier coupled to the baseband symbol clock recovery oscillator for multiplying the baseband receiver input signal by the first and second recovered baseband symbol clock signals to produce first and second demodulation product signals, respectively, a dual filter coupled to the dual multiplier for producing, responsive to the first and second demodulation product signals respectively, first and second baseband demodulated signals, $I_R(t)$ and $Q_R(t)$, whose amplitudes together represent a time series of complex receiver symbols ($I_R$, $Q_R$), and a decoder coupled to the QAM demodulator for recovering the video data from the first and second demodulated signals, $I_R(t)$ and $Q_R(t)$, and a video display coupled to the QAM demodulator for producing images responsive to the video data.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DETAILED DESCRIPTION OF THE EMBODIMENTS

Quadrature Amplitude Modulators:

Digital Quadrature Amplitude Modulation (QAM) schemes may be better understood with reference to the well-known two-dimensional (2-D) QAM symbol constellation diagram showing the QAM symbol states each represented as two (I and Q) amplitudes mapped as points on a complex l-Q plane (herein also denominated "the phase plane"). These 2-D symbol constellation mappings may also be represented as a radius amplitude and a phase angle measured from the phase plane origin, for example, but are generally understood to represent two amplitudes measured from the phase plane origin along the respective orthogonal I and Q axes. In QAM systems, the 2-D symbol constellation states are often arranged in a symmetrical square grid with equal vertical and horizontal spacing, although many other symmetrical configurations are known to be useful (e.g., Cross-QAM). As digital data are usually binary, the number of states (points or symbols) in the constellation is usually a power of two Because the digital QAM symbol constellation is usually square, the common grids are numbered in powers of four; providing us with 16-QAM, 64-QAM, and 256-QAM systems, etc. These well-known square QAM symbol constellations go as high as 4096-QAM, which provides 4 kb/symbol with 64 different amplitude levels in both I and Q. With a higher-order constellation, the QAM system can transmit more bits per symbol but the points are more closely spaced for the same mean constellation energy and are thus more susceptible to noise and other corruption, producing higher bit error rates. Thus, higher-order QAM delivers more data less reliably than lower-order QAM for a given mean constellation energy.

These square symbol constellations are also denominated Type III QAM constellations. A Type I QAM symbol constellation has states arranged symmetrically about the phase plane origin along equally-spaced radial lines extending out from the phase plane origin with the same number of states in each of several concentric circles, A Type II QAM symbol constellation is similar to the Type I but reduces the number of states on the inner concentric circles (because phase angles detection is less accurate at lower amplitudes) while retaining symmetry about the phase plane origin. Type I QAM symbol constellations are square and centered on the phase plane origin. Each state is a 2-D value (I, Q) representing one of "n" amplitudes in I-space and one of "n" amplitudes in Q-space. It graphically represents each QAM symbol with amplitudes alone and the implicit phase angle defined on the phase plane by arctan(IQ) arises only because of the 2-D representation of the amplitude pair (I, Q).

Figure 1:
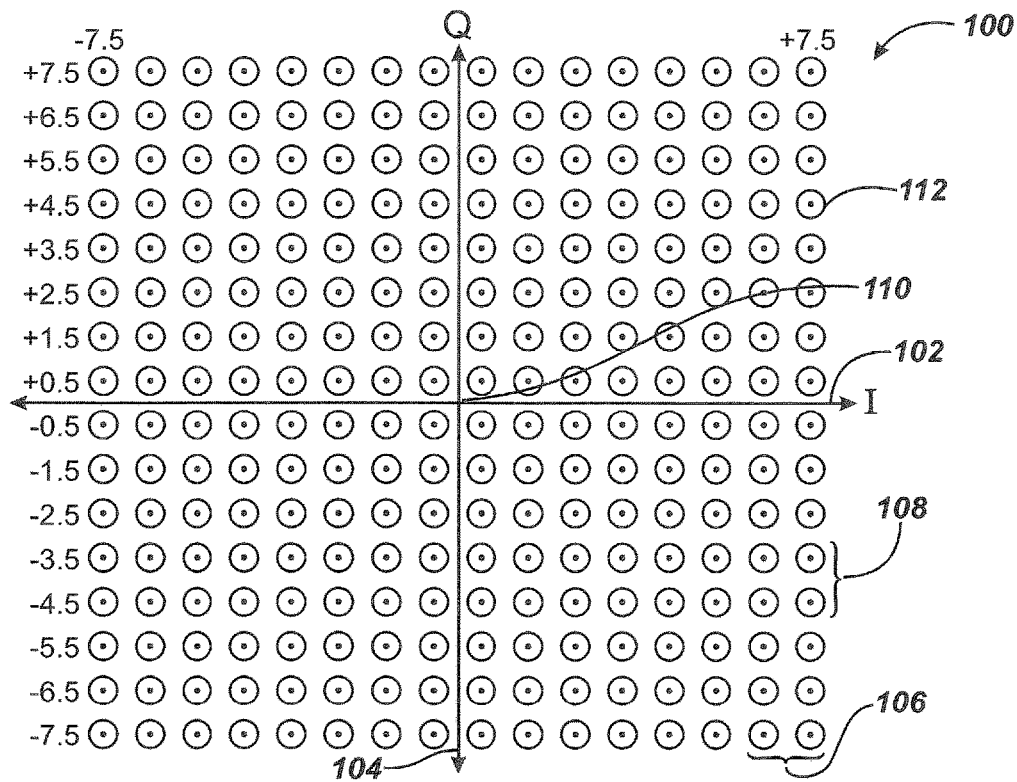
FIG. 1 is a schematic diagram illustrating a typical 256-QAM Type III symmetrical symbol constellation from the prior art.

FIG. 1 is a schematic diagram illustrating a typical 256-QAM Type III constellation 100 from the prior art. In this "square" constellation, the I-space values are represented as sixteen amplitudes ranging from −7.5 units to +7.5 units spaced along the I-axis 102 and the Q-space values are represented as the same sixteen amplitude values spaced along the Q-axis 104. The I-space values are equally spaced by 1.0 unit as exemplified by the spacing 106 and the Q-space values are equally spaced by the same amount as exemplified by the spacing 108. I-axis 102 and Q-axis 104 cross orthogonally at the phase plane origin 110. Each symbol state is represented as a finite region about a point (I, Q), as exemplified by the symbol state 112, which represents eight bits of data; four bits encoded in each of the sixteen amplitude values reserved for I and four bits encoded in each of the sixteen amplitude values reserved for Q. Constellation 100 is disposed with the I-space and Q-space ranges symmetrically centered about phase plane origin 110 such that any I-space baseband modulating signal I(t) and Q-space baseband modulating signal Q(t) together representing a random time-series of (I, Q) symbols will both have zero-mean amplitudes (no DC components) to eliminate clock leakage in the manner well-known in the art.

Figure 2:
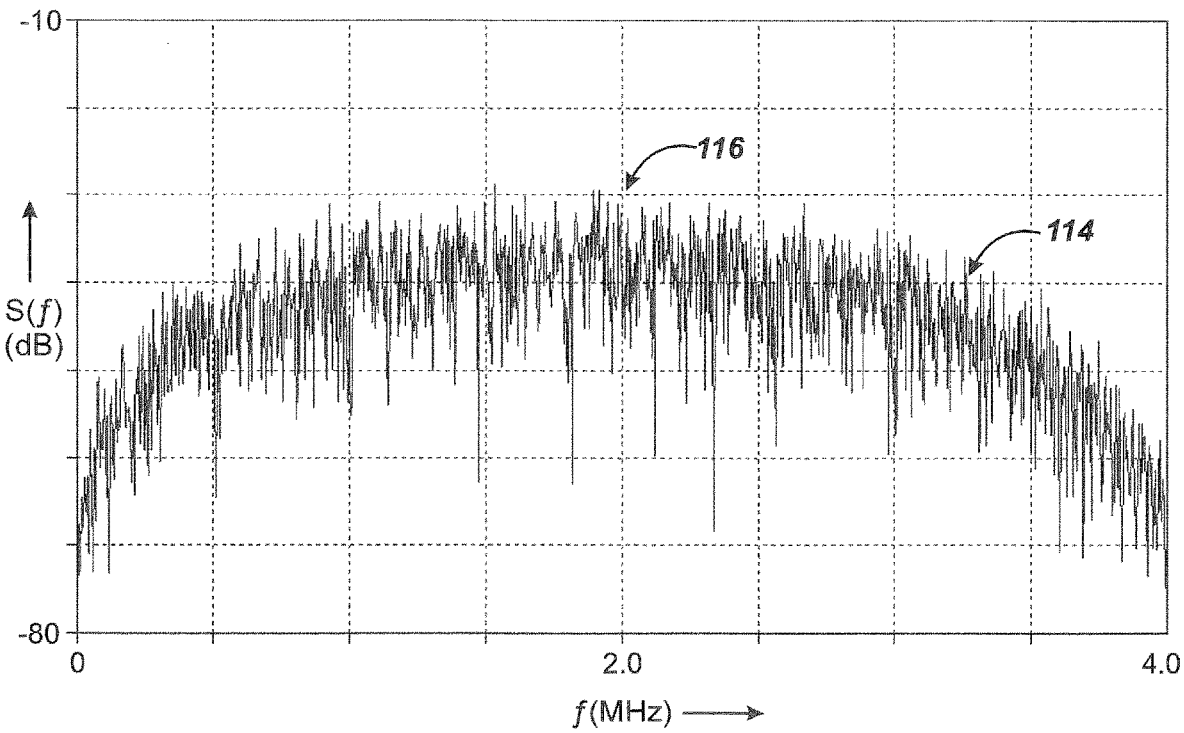
FIG. 2 is a graph of a typical signal spectrum from a typical 256-QAM data communication system from the prior art using the symbol constellation of FIG. 1 while transmitting pseudorandom data at two million symbols per second.

FIG. 2 is a graph of a typical 256-QAM signal spectrum 114 from a typical 256-QAM data transmission system from the prior art (e.g., FIG. 3) using symbol constellation 100 (FIG. 1) while transmitting pseudorandom data at two million symbols per second (using a baseband symbol clock frequency of 2 MHz). As seen in FIG. 2, there is no evidence of any additional signal at the baseband symbol clock frequency 116 or anything else sufficiently "obvious" to allow reconstruction of the baseband symbol clock timing at the receiver. Thus, the QAM reception problem remains complex and unreliable, as is well-known. Various timing recovery tricks are known in the art, ranging from "early-late" guesses (using a predictor-corrector method) to a combined phase-frequency detector, for example. Note that channel estimation and compensation also must be accomplished using the only available information, which is limited to wideband or narrowband power estimation. Various channel estimation solutions known in the art include injecting separate "pilot" signals and other similarly complex techniques, for example. These constraints add unwanted complexity to any QAM receiver.

Figure 3:
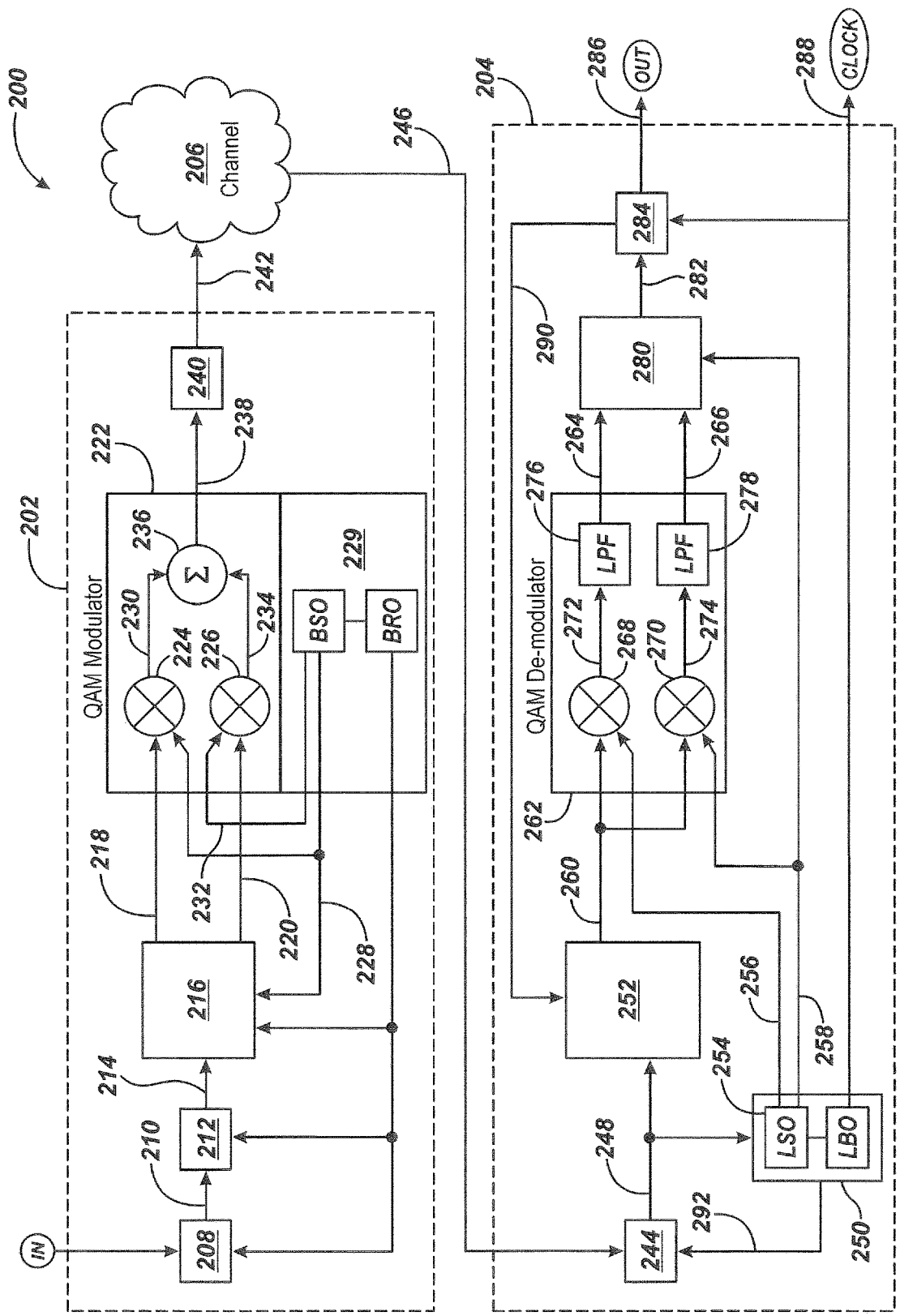
FIG. 3 is a schematic diagram illustrating a typical QAM data communication system from the prior art.

FIG. 3 is a schematic diagram illustrating a typical QAM communication system 200 from the prior art, including a QAM data transmitter 202 and a QAM data receiver 204 coupled by a signal channel 206. In FIG. 3, a data input 208 accepts a stream of incoming data 210 for processing and transmission. Incoming data 210 is routed to the encoder 212 for randomizing, interleaving, error-correction and other high-level encoding, for example. The randomized data 214 is then routed to the QAM encoder 216, which separates the data into the two baseband modulating signals, $I_T(t)$ 218 and $Q_T(t)$ 220, which together represent a time-series of complex transmitter symbols $(I_T, Q_T)$ (not shown) selected according to the mapping of each pair of four-bit sequences of randomized data 214 onto constellation 100 (FIG. 1). This mapping is important because each complex transmitter symbol $(I_T, Q_T)$ represents eight bits in this example. A channel deficiency is most likely to cause a symbol error by incorrectly assessing the corresponding received symbol as the one immediately adjacent the transmitted symbol in constellation 100 (FIG. 1), so encoder 212 must encode incoming data 210 to minimize the overall bit error rate arising from simple symbol errors. Simple binary coding, for example, is not very robust against bit errors (e.g., a single symbol step from 01111111 to 10000000 collects eight bit errors) so the symbol mapping strategy must be chosen carefully, as is well known. A "Gray" code is useful and commonly used.

The two baseband modulating signals, $I_T(t)$ 218 and $Q_T(t)$ 220, are accepted by a QAM modulator 222 that includes an I-modulator 224 and a Q-modulator 226 embodied as a dual multiplier. I-modulator 224 modulates a zero-degree-phase baseband symbol clock signal 228 from the baseband symbol clock oscillator 229 by multiplying it with baseband modulating signal $I_T(t)$ 218 to produce an I-modulation product signal 230 and Q-modulator 226 modulates a ninety-degree-phase baseband symbol clock signal 232 by multiplying it with baseband modulating signal $Q_T(t)$ 220 to produce a Q-modulation product signal 234. A summer 236 then adds I-modulation product signal 230 and Q-modulation product signal 234 in the usual manner to produce a transmitter output signal 238, which, in this example, is filtered and conditioned at the filter and driver assembly 240 to produce a filtered transmitter output signal 242 that is conditioned for transfer through the physical transmission medium in signal channel 206 to QAM receiver 204. Zero-degree-phase and ninety-degree-phase baseband symbol clock signals 228 and 232 are said to be generally fixed in quadrature because they are phase-locked to one another with a 90-degree phase difference in the usual manner. Signal channel 206 may include conductive wiring, optical fiber, modulated radio frequency or optical signals in free space, or any other useful channel means known in the art, for example. Filter and driver assembly 240 may include an additional modulator(s) (not shown) for reconditioning transmitter output signal 238 as a modulation product of another carrier signal more suited to the signal channel medium, for example.

Continuing with FIG. 3, a signal conditioner 244 in QAM data receiver 204 accepts from signal channel 206 a channel signal 246 that represents filtered transmitter output signal 242 in some manner, depending on particular channel characteristics, added noise, and the like. Signal conditioner 244 may include an additional demodulator(s) (not shown) for recovering the baseband component of channel signal 246 when using another carrier signal more suited to the signal channel medium, for example. Signal conditioner 244 restores the signal level and provides any additional (usually analog) reconditioning necessary to produce a baseband receiver input signal 248. From here, receiver input signal 248 takes two paths; the first taking it to a baseband symbol clock detector 250 for baseband symbol clock timing recovery and the second taking it to an equalization and correction circuit 252 for any additional processing necessary to correct for noise, intersymbol interference (ISI) and other unwanted effects of the trip through signal channel 206. Baseband symbol clock detector 250 includes a baseband symbol clock recovery oscillator 254 that produces a zero-degree-phase recovered baseband symbol clock signal 256 and a ninety-degree-phase recovered baseband symbol clock signal 258, which are generally fixed in quadrature and respectively synchronized with baseband symbol clock signals 228 and 232 above. Equalization and correction circuit 252 produces a baseband receiver input signal 260 that (as much as possible) represents the recovery of transmitter output signal 238.

The baseband receiver input signal 260 from equalization and correction circuit 252 is routed to the QAM demodulator 262 for recovery of the two baseband demodulated signals, $I_R(t)$ 264 and $Q_R(t)$ 266, together representing a time series of complex receiver symbols $(I_R, Q_R)$ that (as much as possible) represent the recovery of the initial time-series of complex transmitter symbols $(I_T, Q_T)$ discussed above. This is accomplished by an I-demodulator 268 and a Q-demodulator 270 embodied as a dual multiplier. I-demodulator 268 demodulates baseband receiver input signal 260 by multiplying it with zero-degree-phase recovered baseband symbol clock signal 256 to produce an I-demodulation product signal 272 and Q-demodulator 270 demodulates baseband receiver input signal 260 by multiplying it with ninety-degree-phase recovered baseband symbol clock signal 258 to produce a Q-demodulation product signal 274. I-demodulation product signal 272 is passed through a first low-pass filter 276 to recover baseband demodulated signal $I_R(t)$ 264 and Q-demodulation product signal 274 is passed through a second low-pass filter 278 to recover baseband demodulated signal $Q_R(t)$ 266 in the usual manner. From QAM demodulator 262, both baseband demodulated signals, $I_R(t)$ 264 and $Q_R(t)$ 266 are presented to the QAM decoder 280 for reversal of the 2-D constellation mapping process performed in QAM encoder 216 and discussed above to produce the recovered randomized data 282. Finally, in the decoder 284, the randomizing, interleaving, error-correction and other high-level encoding processing performed in encoder 212 and discussed above is reversed to produce a stream of output data 286 corrected for errors where possible and timed according to a bit rate clock signal 288 from baseband symbol clock detector 250. A feedback line 290 to equalization and correction circuit 252 permits recovery optimization by adjusting the conditioning of receiver input signal 248 to minimize errors detected and corrected in recovered randomized data 282 by decoder 284, for example.

To appreciate the detailed operation of QAM communication system 200 (FIG. 3) consider a simple QAM encoding example based on 256-QAM Type II constellation 100 (FIG. 1). Referring to FIG. 3, consider the details of passing several complex transmitter symbols ($I_T$, $Q_T$) through QAM communication system 200 starting with QAM modulator 222 and assuming that transmitter output signal 238 passes through signal channel 206 to QAM data receiver 204 with perfect fidelity.

As QAM operates with quantized amplitudes, assume that the I-axis 102 and Q-axis 104 range from −7.5 units to 7.5 units, in 1.0 unit steps. For example, the units may represent volts or any other physical denomination suitable to the application. This arrangement thereby provides sixteen amplitudes along each axis that may be conveniently mapped (in any sequence) to the sixteen available four-bit binary sequences ranging from 0000 to 1111, consistent with the above discussion. Assume for this illustration that the stream of incoming data 210 is sixteen bits long and may be mapped by constellation 100 to the following two exemplary complex transmitter symbols ($I_T$, $Q_T$) over two complete four-part baseband symbol clock cycles (using logical amplitude units):

Complex transmitter symbols ($I_T$, $Q_T$): (+1.5, −6.5) and (−3.5, +5.5)

So, the two baseband modulating signals, $I_T(t)$ 218 and $Q_T(t)$ 220 have the following amplitudes over the two four-part baseband symbol clock cycles:

First baseband modulating signal, $I_T(t)$ 218: +1.5,+0.5, +5,+1.5,−3.5,−3.5,−3.5,−3.5 Second baseband modulating signal, $Q_T(t)$ 220: −6.5,−6.5,−6.5,−6.5,+5,5,+5.5, +5.5,+5.5

Assuming that, in QAM modulator 222, baseband symbol clock signal 228 is a square wave with either a 0 or 1 logical amplitude, the following symbol clock signal values describe the two complete four-part symbol clock cycles mapping onto these two complex transmitter symbols ($I_T$, $Q_T$):

Zero-degree-phase baseband symbol clock signal 228 (I-clock): +1,+1,−1,+1,+1,−1,−1
Ninety-degree-phase baseband symbol clock signal 232 (Q-clock): −1,+1,+1,−1,−1,+1,+1,−1

After the multiplications in I-modulator 224 and Q-modulator 226, the resulting modulation product signal amplitudes over the two four-part baseband symbol clock cycles are:

I-modulation product signal 230: +1.5,+1.5,−1.5,1.5, −3.5,−3.5,+3.5,+3.5
Q-modulation product signal 234: +6.5,−6.5,−6.5,+6.5, −5.5,+5.5,+5.5,−5.5

When added together at summer 236, the amplitude of transmitter output signal 238 over the two four-part baseband symbol clock cycles is:

Transmitter output signal 238: +8.0,−5.0,−8.0,+5.0,−9.0, +2.0,+9.0,−2.0

In this example, transmitter output signal 238 is also the receiver input signal 248 arriving at QAM data receiver 204 from which two complex receiver symbols ($I_R$, $Q_R$) must be recovered and decoded to recover the stream of incoming data 210 without error if possible.

Receiver input signal 248: +8.0,−5.0,−8.0,+5.0,−9.0, +2.0,+9.0,−2.0

Assuming that zero-degree-phase recovered baseband symbol clock signal 256 can be precisely synchronized with zero-degree-phase baseband symbol clock signal 228 in QAM data transmitter 202, then baseband symbol clock recovery oscillator 254 provides the following logical amplitudes over two complete four-part recovered baseband symbol clock cycles:

Zero-degree-phase recovered baseband symbol clock signal 256: +1,+1,−1,−1,+1,+1,−1, −1
Ninety-degree-phase recovered baseband symbol clock signal 258: −1,+1,+1,−1,−1,+1,+1,−1

Thus, after the multiplications in I-demodulator 268 and Q-demodulator 270, the following two demodulation product signals are produced complete four-part recovered baseband symbol clock cycles:

I-demodulation product signal 272: +8.0,−5.0,+8.0,−5.0, −9.0,+2.0,−9.0,+2.0
Q-demodulation product signal 274: −8.0,−5.0,−8.0, −5.0,+9.0,+2.0,+9.0,+2.0

Passing each of these two product signals through their respective low-pass filters 276 and 278 can be assumed to produce a average value over each full baseband symbol clock cycle, thereby producing the following logical amplitude averages for the two baseband demodulated signals, $I_R(t)$ 264 and $Q_R(t)$ 266 over two complete recovered baseband symbol clock cycles:

First baseband demodulated signal $I_R(t)$ 264: 6.0/4=+1.5, −14.0/4=−3.5
Second baseband demodulated signal $Q_R(t)$ 266: −26.0/ 4=−6.5, 22.0/4=+5.5
Complex receiver symbols ($I_R$, $Q_R$): (+1.5, −6.5) and (−3.5,+5.5)

Finally, in QAM decoder 280 and decoder 284, the two complex receiver symbols ($I_R$, $Q_R$) are decoded with reference to constellation 100 (FIG. 1) to obtain the stream of output data 286 that represents (ideally without error) original data stream 210. In this example, two symbols at the channel symbol rate serves to transmit and correctly receive sixteen bits of information. In a practical application, assuming adequate timing recovery means, the received signal may be sampled four times during the baseband symbol clock cycle to retrieve the data correctly.

Improving QAM Clock Recovery:

Notice that some form of timing recovery must be performed in baseband symbol clock detector 250 to recover baseband symbol clock signals 256 and 258 as well as bit rate clock signal 288. The QAM receiver clock recovery function is expensive in terms of computing (and electrical) power and parts cost. The reason for this may be appreciated with reference to FIG. 2. Note that 256-QAM signal spectrum 114 in FIG. 2 is nulled at 0 Hz (DC) and 4 MHz (twice the 2 MHz symbol clock rate), but has no prominent component at the symbol clock rate 116 so that baseband symbol clock recovery is feasible only by applying exotic statistical methods to receiver input signal 248. But these exotic computational components are expensive. So, although QAM data communication system 200 provides some utility and QAM data transmitter 202 alone is relatively inexpensive, QAM data receiver 204 can be too complex and expensive for simple applications, such as pipe inspection systems, for example.

Figure 4:
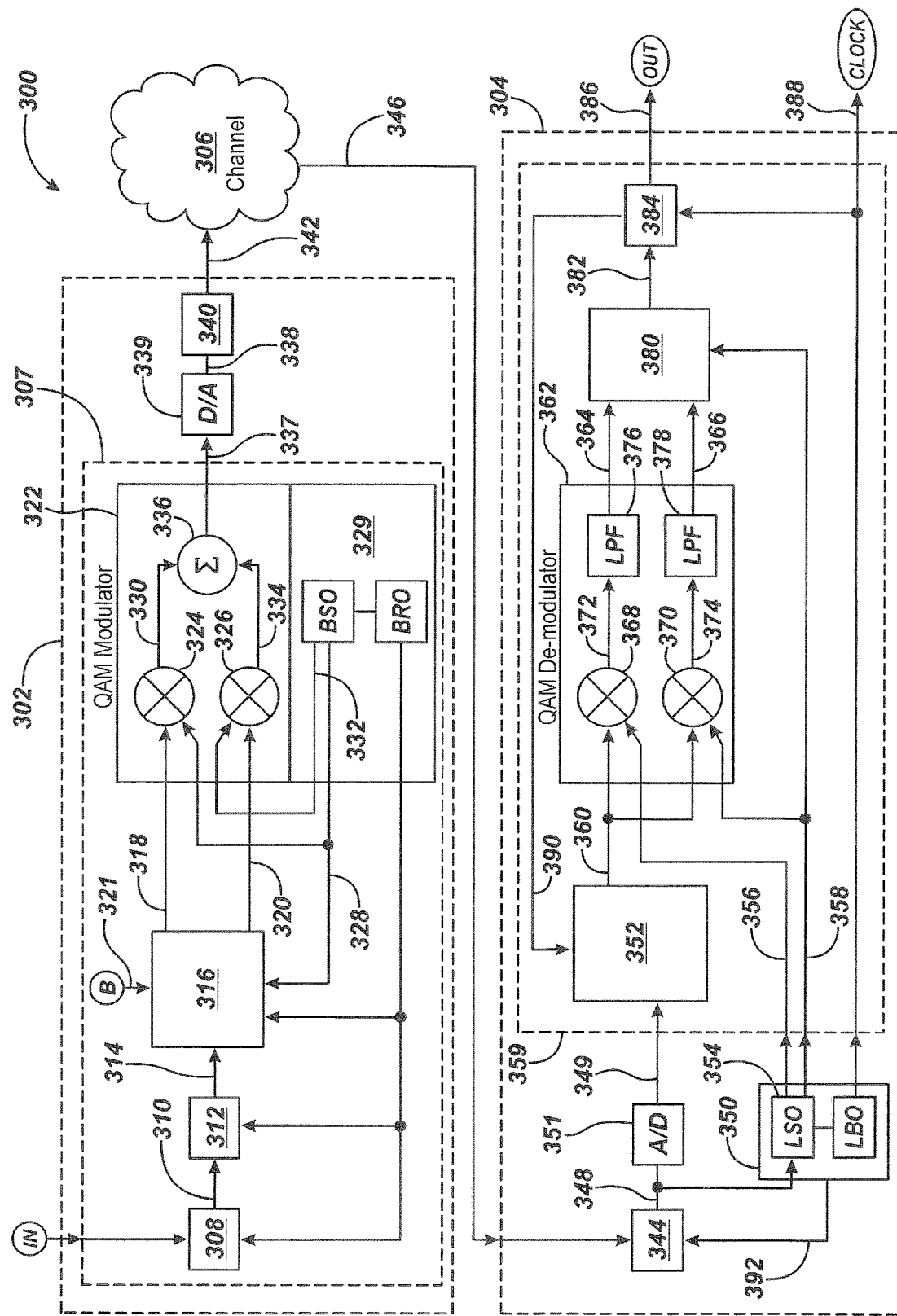
FIG. 4 is a schematic diagram illustrating an exemplary embodiment of a QAM data communication system of this invention.

FIG. 4 is a schematic diagram illustrating an exemplary QAM data communication system embodiment 300 of this invention, including a QAM data transmitter 302 and a QAM data receiver 304 coupled through a signal channel 306. In this embodiment, many of the transmitter functions in QAM data transmitter 302 are embodied as software (or firmware) programs in a Digital Signal Processor (DSP) 307 with programming adapted to accept a stream of incoming data 310 for processing and transmission. Incoming data 310 is routed to the encoder 312 for randomizing, interleaving, error-correction and other high-level encoding, for example. The randomized data 314 is then routed to the QAM encoder 316, which separates the data into the two baseband modulating signals, I(t) 318 and $Q_T(t)$ 320, which together represent a time-series of complex transmitter symbols ($I_T$, $Q_T$) (not shown) selected according to the mapping of each pair of four-bit sequences of randomized data 314 onto an asymmetric symbol constellation of this invention exemplified by the 256-QAM asymmetrical symbol constellation 400 shown in FIG. 5A and by the 256-QAM asymmetrical symbol constellation 500 shown in FIG. 5B.

Figure 5A:
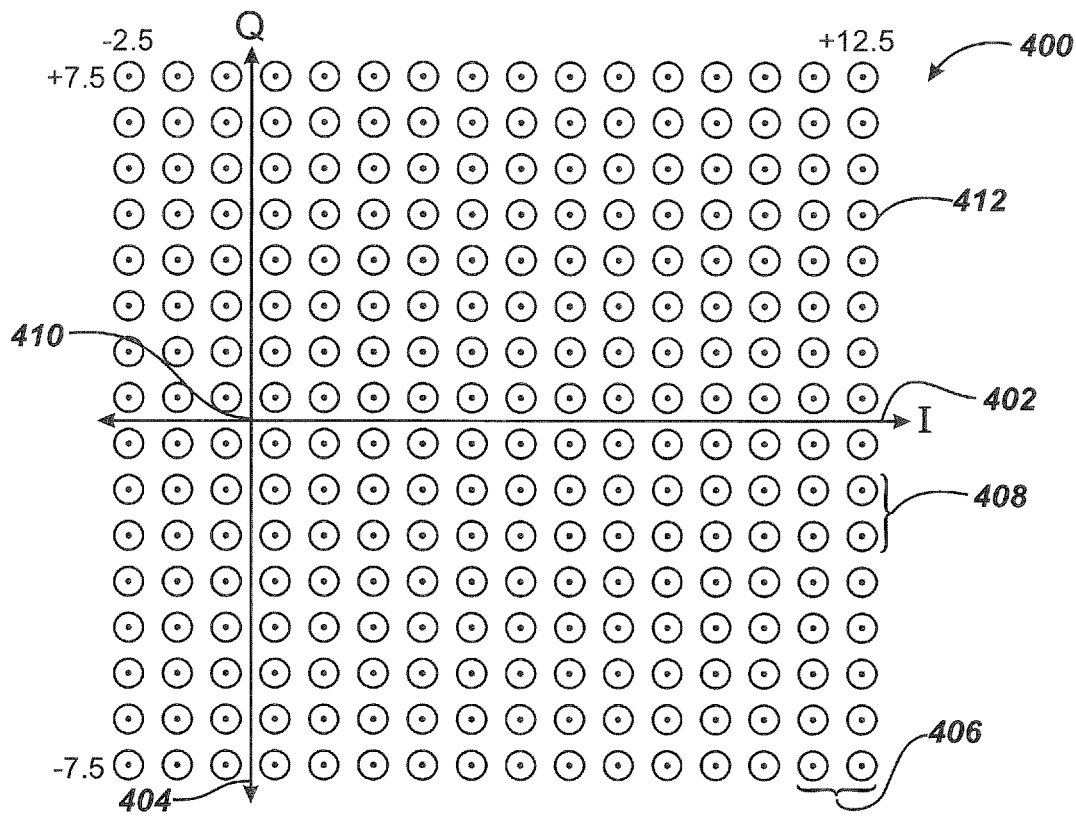
FIG. 5A is a schematic diagram illustrating an exemplary 256-QAM asymmetrical symbol constellation suitable for use in the system of this invention.
Figure 5B:
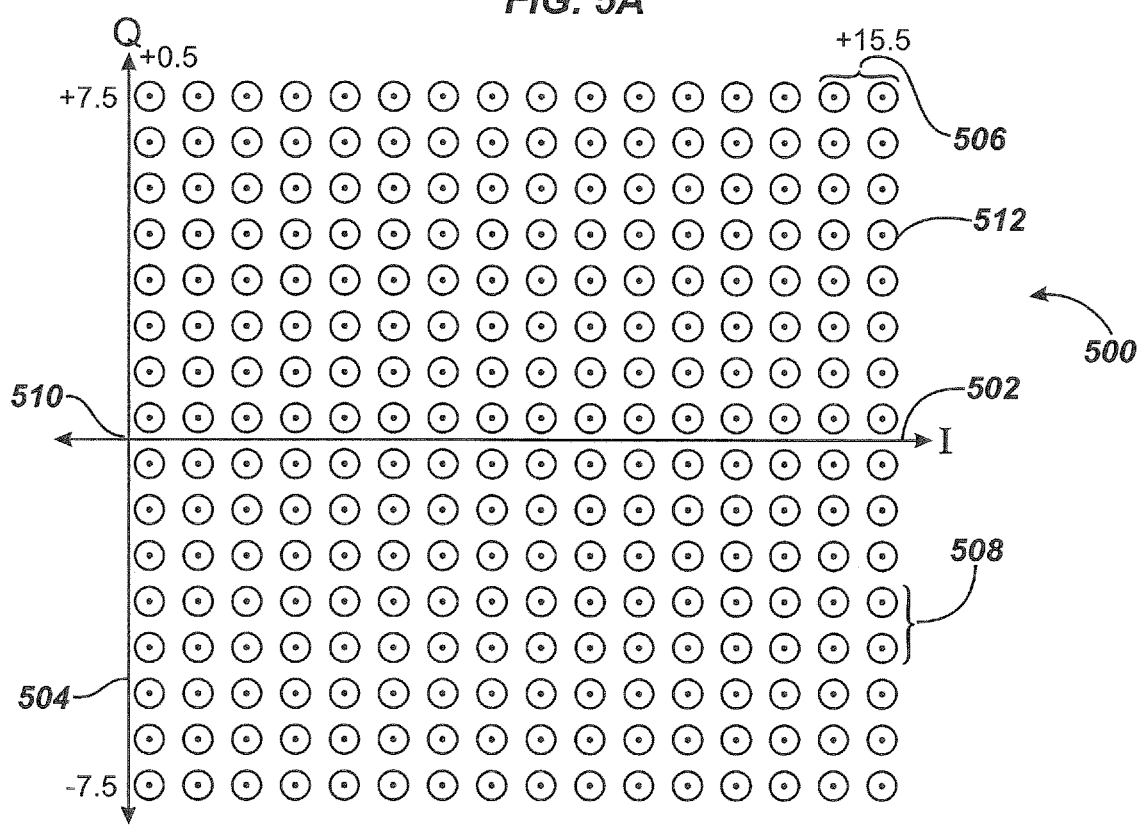
FIG. 5B is a schematic diagram illustrating an alternative 256-QAM asymmetrical symbol constellation suitable for use in the system of this invention.

FIG. 5A is a schematic diagram illustrating an exemplary 256-QAM asymmetrical symbol constellation 400 of this invention suitable for use in QAM communication system 300 (FIG. 4). In this "asymmetric" constellation, the I-space values are represented as sixteen amplitudes ranging from −2.5 units to +12.5 units spaced along the I-axis 402 and the Q-space values are represented as the same sixteen amplitudes ranging from −7.5 units to +7.5 units spaced along the Q-axis 404. The I-space values are equally spaced by 1.0 units as exemplified by the spacing 406 and the Q-space values are equally spaced by the same amount as exemplified by the spacing 408. I-axis 402 and Q-axis 404 cross orthogonally at the phase plane origin 410. Each symbol state is represented as a finite region about a point (L Q), as exemplified by the symbol state 412, which represents eight bits of data; four bits encoded in each of the sixteen amplitude values reserved for I and four bits encoded in each of the sixteen amplitude values reserved for Q. Constellation 400 is disposed with the I-space and Q-space ranges asymmetrically about phase plane origin 410 such that any I-space baseband modulating signal I(t) and Q-space baseband modulating signal Q(t) together representing a random time-series of (I, Q) symbols will have mean amplitudes (DC components) that are substantially non-zero (+5.0 units in I-space for constellation 400) for I-space baseband modulating signal I(t) and substantially zero for Q-space baseband modulating signal Q(t). FIG. 5B is a schematic diagram illustrating an alternative 256-QAM asymmetrical symbol constellation 500 suitable for use in QAM communication system 300 (FIG. 4). In this "asymmetric" constellation, the I-space values are represented as sixteen amplitudes ranging from +05 units to +15.5 units spaced along the I-axis 502 and the Q-space values are represented as the same sixteen amplitudes ranging from −7.5 units to +7.5 units spaced along the Q-axis 504. The I-space values are equally spaced by 1.0 units as exemplified by the spacing 506 and the Q-space values are equally spaced by the same amount as exemplified by the spacing 508. I-axis 502 and Q-axis 504 cross orthogonally at the phase plane origin 510. Each symbol state is represented as a finite region about a point (I, Q), as exemplified by the symbol state 512, which represents eight bits of data; four bits encoded in each of the sixteen amplitude values reserved for I and four bits encoded in each of the sixteen amplitude values reserved for Q. Constellation 500 is disposed with the I-space and Q-space ranges asymmetrically about phase plane origin 510 such that any 1-space baseband modulating signal I(t) and Q-space baseband modulating signal Q(t) together representing a random time-series of (I, Q) symbols will have mean amplitudes (DC components) that are substantially non-zero (+8.0 units in I-space for constellation 500) for I-space baseband modulating signal I(t) and substantially zero for Q-space baseband modulating signal Q(t). The non-zero DC bias of at least one of the two baseband modulating signals is an important element of the system of this invention and either or both of the two baseband modulating signals may be biased to create a suitable asymmetric constellation in accordance with these teachings.

Returning to FIG. 4, a constellation bias signal 321 is shown as an input to QAM encoder 316 to illustrate the method for shifting the symbol constellation exemplified by constellation 400, which may be thought of as adding a DC bias to either or both baseband modulating signals, $I_T(t)$ 318 and $Q_T(t)$ 320 during the encoding process in QAM encoder 316, for example. This facilitates using constellation bias signal 321 to adjust the asymmetric constellation exemplified by constellation 400 in response to channel type and conditions or for other purposes, for example.

The two baseband modulating signals, $I_T(t)$ 318 and $Q_T(t)$ 320, are accepted by a QAM modulator 322 that includes an I-modulator 324 and a Q-modulator 326 embodied as a dual multiplier. I-modulator 324 modulates a zero-degree-phase baseband symbol clock signal 328 from the baseband symbol clock oscillator 329 by multiplying it with baseband modulating signal $I_T(t)$ 318 to produce an I-modulation product signal 330 and Q-modulator 326 modulates a ninety-degree-phase baseband symbol clock signal 332 from baseband symbol clock oscillator 329 by multiplying it with baseband modulating signal $Q_T(t)$ 320 to produce a Q-modulation product signal 334. A summer 336 then adds I-modulation product signal 330 and Q-modulation product signal 334 in the usual manner to produce a digital transmitter output signal 337, which is then converted to an analog transmitter output signal 338 by the digital-to-analog converter 339. Transmitter output signal 338 is filtered and conditioned at the filter and driver assembly 340 to produce a filtered transmitter output signal 342 that is conditioned for transfer through the physical transmission medium in signal channel 306 to QAM receiver 304. Zero-degree-phase and ninety-degree-phase baseband symbol clock signals 328 and 332 are said to be generally fixed in quadrature because they are phase-locked to one another with a 90-degree phase difference in the usual manner. Signal channel 306 may include conductive wiring, optical fiber, modulated radio frequency or optical signals in free space, or any other useful channel means known in the art, for example. Filter and driver assembly 340 may include an additional modulator(s) (not shown) for reconditioning transmitter output signal 338 as a modulation product of another carrier signal more suited to the signal channel medium, for example.

Continuing with FIG. 4, a signal conditioner 344 in QAM data receiver 304 accepts from signal channel 306 a channel signal 346 that represents filtered transmitter output signal 342 in some manner, depending on particular channel characteristics, added noise, and the like. Signal conditioner 344 may include an additional demodulator(s) (not shown) for recovering the baseband component of channel signal 346 when using another carrier signal more suited to the signal channel medium, for example. Signal conditioner 344 restores the signal level and provides any additional (usually analog) reconditioning necessary to produce a baseband receiver input signal 348, which may now be converted back to a digital receiver input signal 349 by means of an analog-to-digital converter 351, which may be synchronized with baseband symbol clock detector 350 substantially as shown. In this embodiment, many of the receiver functions in QAM data receiver 304 are embodied as software (or firmware) programs in a Digital Signal Processor (DSP) 359 with programming adapted to accept the digital receiver input signal 349 for decoding and processing. In addition to the functional elements shown FIG. 4, DSP 359 may also embrace portions of baseband symbol clock detector 350. Most remaining complexity in QAM data receiver 304 is found in signal conditioner 344 and the remainder of baseband symbol clock detector 350. But baseband symbol clock detector 350 may now be implemented as a "simple" Phase Locked Loop (PLL) circuit, for example, because of the asymmetrical symbol constellation 400 used in QAM transmitter 302, for the reasons discussed herein below in connection with FIGS. 15-16. Notice that using DSP 359 in QAM data receiver 304 and the simple PLL implementation of provides a simple and cost effective embodiment of the receiving element of this invention, thereby meeting the primary purpose of the system of this invention. This allows QAM techniques to be applied in a much more cost effective manner than previously known, making QAM feasible for applications for which it was previously cost prohibitive.

Continuing with the remainder of FIG. 4, from signal conditioner 344, receiver input signal 348 takes two paths; the first taking it to a baseband symbol clock detector 350 for baseband symbol clock timing recovery and the second taking it to analog-to-digital converter 351 for digitization to produce digital receiver input signal 349, which is presented to an equalization and correction circuit 352 for any additional processing necessary to correct for noise, intersymbol interference (ISI) and other unwanted effects of the trip through signal channel 306. Baseband symbol clock detector 350 includes a baseband symbol clock recovery oscillator 354 that produces a zero-degree-phase recovered baseband symbol clock signal 356 and a ninety-degree-phase recovered baseband symbol clock signal 358, which are generally fixed in quadrature and respectively synchronized with baseband symbol clock signals 328 and 332 above.

Equalization and correction circuit 352 produces a baseband receiver input signal 360 that (as much as possible) represents the recovery of transmitter output signal 338. The baseband receiver input signal 360 from equalization and correction circuit 352 is routed to the QAM demodulator 362 for recovery of the two baseband demodulated signals, $I_R(t)$ 364 and $Q_R(t)$ 366, together representing a time series of complex receiver symbols ($I_R$, $Q_R$) that (as much as possible) represent the recovery of the initial time-series of complex transmitter symbols ($I_T$, $Q_R$) discussed above. This is accomplished by an I-demodulator 368 and a Q-demodulator 370 embodied as a dual multiplier. I-demodulator 368 demodulates baseband receiver input signal 360 by multiplying it with zero-degree-phase recovered baseband symbol clock signal 356 to produce an I-demodulation product signal 372 and Q-demodulator 370 demodulates baseband receiver input signal 360 by multiplying it with ninety-degree-phase recovered baseband symbol clock signal 358 to produce a Q-demodulation product signal 374. I-demodulation product signal 372 is passed through a first low-pass filter 376 to recover baseband demodulated signal $I_R(t)$ 364 and Q-demodulation product signal 374 is passed through a second low-pass filter 378 to recover baseband demodulated signal $Q_R(t)$ 366 in the usual manner, From QAM demodulator 362, both baseband demodulated signals, $I_R(t)$ 364 and $Q_R(t)$ 366 are presented to the QAM decoder 380 for reversal of the 2-D constellation mapping process performed in QAM encoder 316 and discussed above to produce the recovered randomized data 382. Finally, in the decoder 384, the randomizing, interleaving, error-correction and other high-level encoding processing performed in encoder 312 and discussed above is reversed to produce a stream of output data 386 corrected for errors where possible and timed according to a bit rate clock signal 388 from baseband symbol clock detector 350. A feedback line 390 to equalization and correction circuit 352 permits recovery optimization by adjusting the conditioning of receiver input signal 348 to minimize errors detected and corrected in recovered randomized data 382 by decoder 384, for example.

Figure 6:
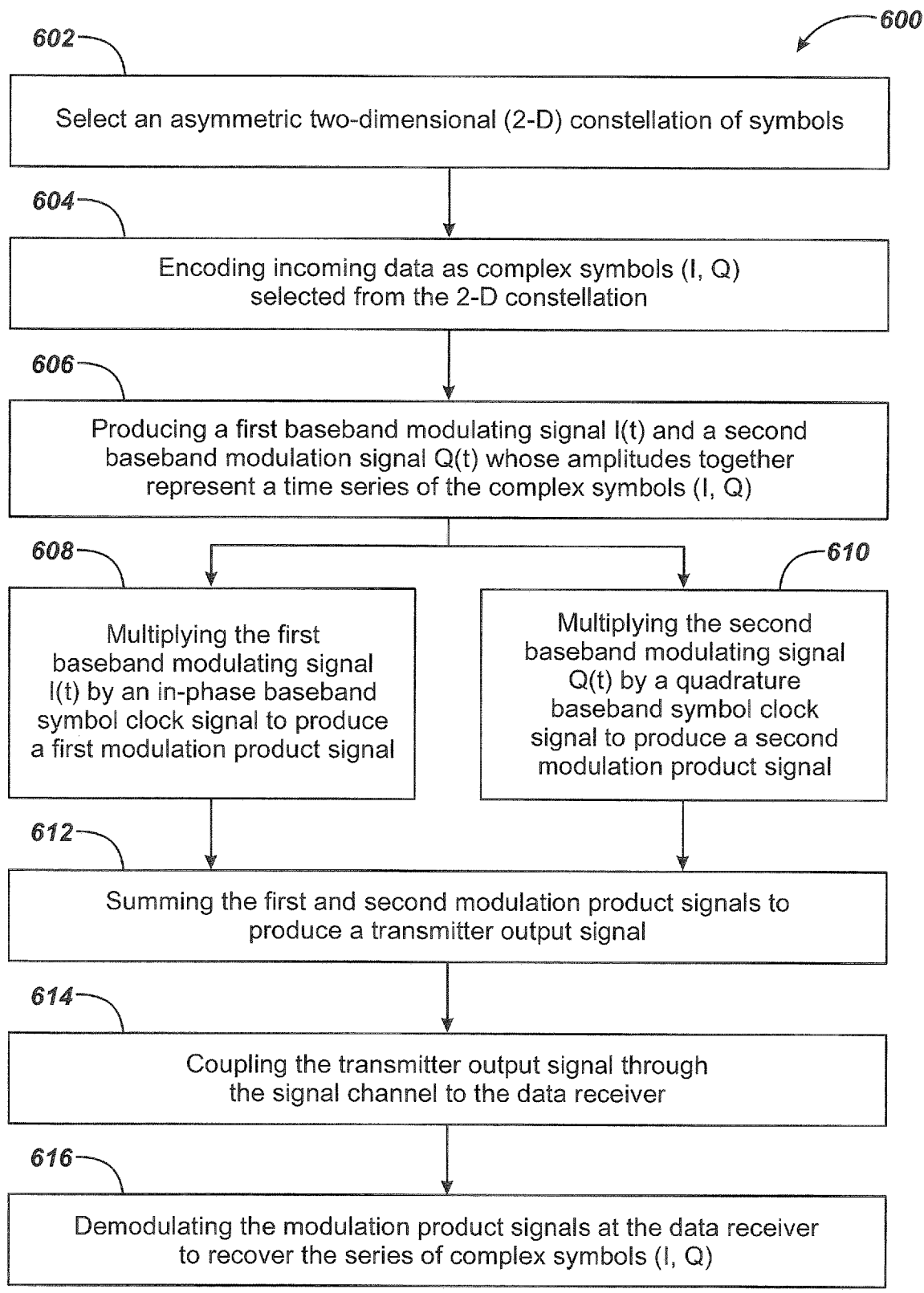
FIG. 6 is a flowchart illustrating an exemplary method of this invention for transferring data through a signal channel.

FIG. 6 is a flowchart illustrating an exemplary method 600 of this invention for transferring data through signal channel 306. Method 600 begins at the step 602 by first selecting a two-dimensional (2-D) constellation of symbols distributed on the phase plane asymmetrically about the origin, such as constellation 400 or constellation 500 discussed above in connection with FIGS. 5A-B, for example. Next, at the step 604, the incoming data are encoded as complex symbols (I, Q) selected from the 2-D constellation, and, in the step 606, first and second baseband modulating signals I(t) and Q(t) are produced, whose amplitudes together represent the time series of complex symbols (I, Q) and at least one of the baseband modulating signals has a substantially non-zero mean amplitude. Then, in the step 608, the first baseband modulating signal I(t) is multiplied by an in-phase baseband symbol clock signal to produce a first modulation product signal as, in the step 610, the second baseband modulating signal Q(t) is multiplied by a quadrature baseband symbol clock signal to produce a second modulation product signal. In the step 612, the first and second modulation product signals are summed to produce a transmitter output signal, which is coupled through the signal channel to the data receiver in the step 614. Finally, in the step 616, the two modulation product signals are demodulated at the data receiver to recover the series of complex symbols (I, Q), thereby facilitating recovery of the incoming data (not shown).

Improving QAM Bit Error Rate (BER) Performance:

The Type III (square) 2-D symbol constellation known in the art and exemplified by constellation 100 (FIG. 1), is disposed so that the modulating signal amplitudes are symmetrical around zero (phase plane origin 110), as are all other 2-D QAM symbol constellations of any type. This is a well-known QAM system requirement arising from the universal and well-founded belief that QAM communication system BER performance is diminished when any power is "wasted" in a carrier (baseband symbol clock) signal. As is known in the art, adding sufficiently exotic (and expensive) timing recovery means to the QAM receiver can overcome much of the timing recovery problem arising from the complete suppression of the carrier (baseband symbol clock) signal and thereby avoid most of the BER performance penalty arising from baseband symbol clock recovery error. This situation, and the unexpectedly advantageous observation leading to the method of this invention, may be better appreciated with reference to the following discussion of the effects of various system abnormalities on theoretical QAM system BER.

Figure 7:
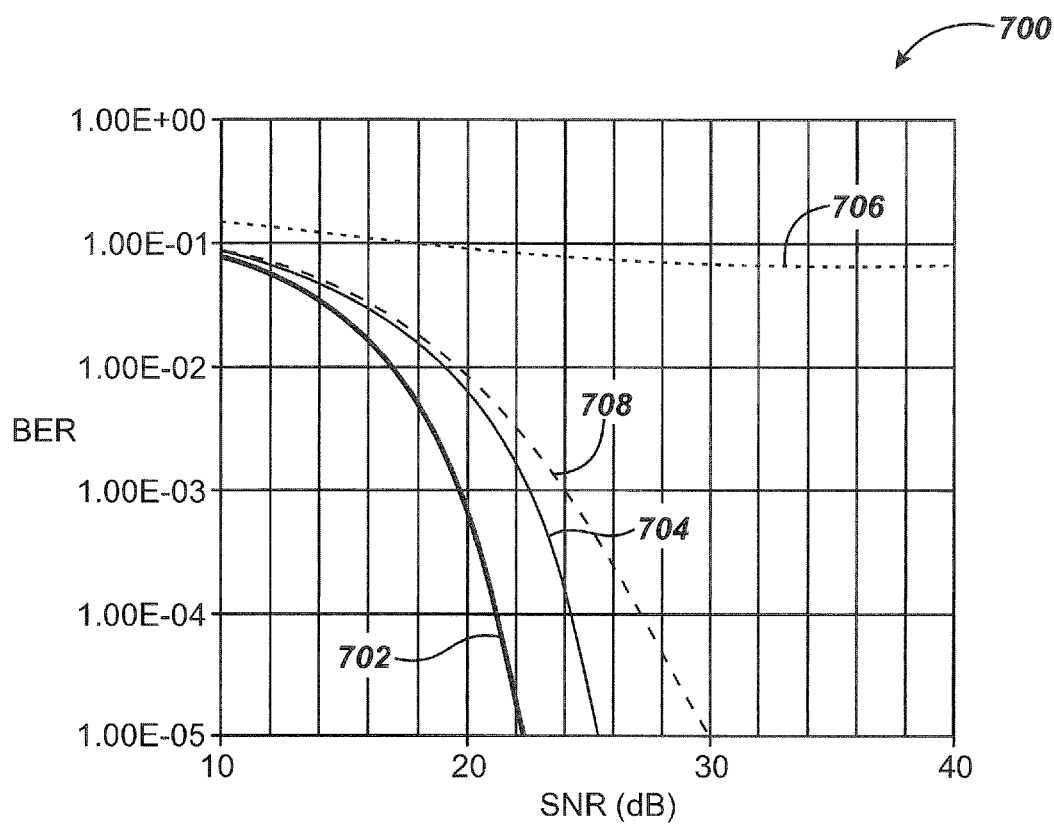
FIG. 7 is a graph illustrating the theoretical Bit Error Rate (BER) characteristics for several 256-QAM system embodiments from the prior art.
Figure 8A:
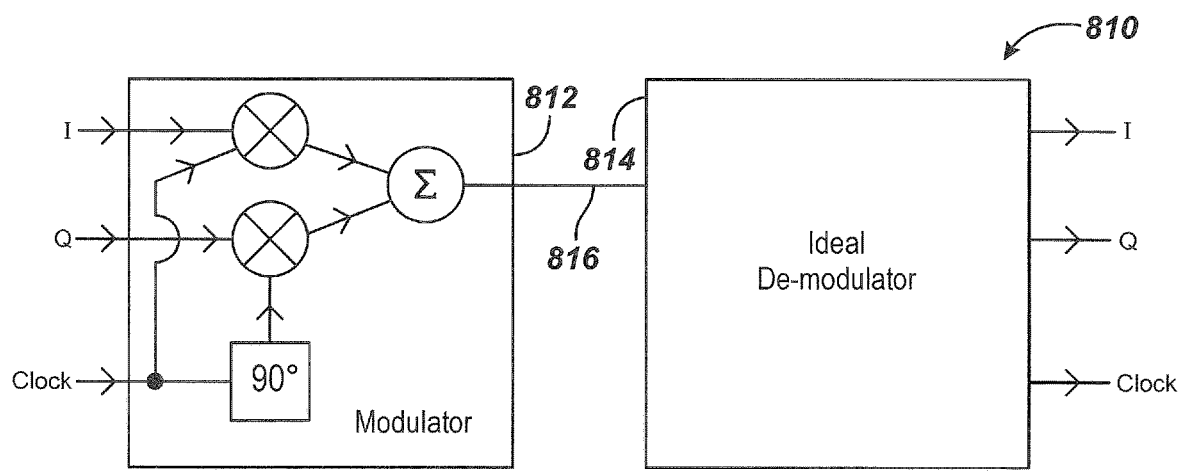
FIG. 8A is a block diagram illustrating a first embodiment of a QAM modulator and demodulator assuming ideal demodulation.

FIG. 7 provides a graph 700 illustrating the theoretical BER under various operating conditions for several 256-QAM communications system embodiments from the prior art. The BER curve 702 provides the predicted BER of the ideal theoretical QAM modulator and demodulator embodiment 810 shown in FIG. 8A. As shown in FIG. 8A, embodiment 810 includes a QAM modulator 812 coupled to a QAM demodulator 814 through an ideal signal channel 816. No actual channel or baseband symbol clock apparatus is shown because theoretically ideal demodulation is assumed for the purposes of predicting BER curve 70.

Figure 8B:
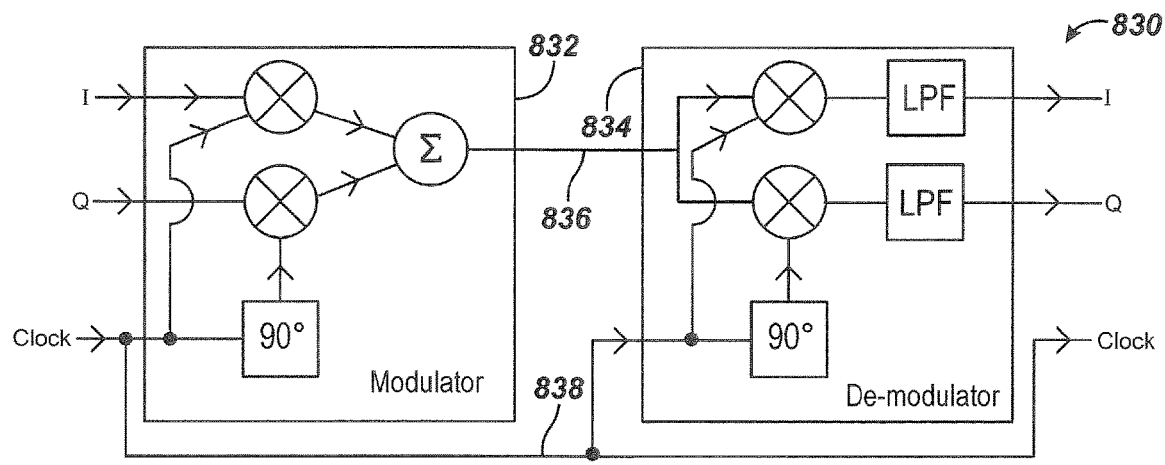
FIG. 8B is a block diagram illustrating a second embodiment of a QAM modulator and demodulator using the undistorted modulator baseband symbol clock signal at the demodulator.

In FIG. 7, the BER curve 704 provides the predicted BER of the theoretical QAM modulator and demodulator embodiment 830 shown in FIG. 8B. As shown in FIG. 8B, embodiment 830 includes a QAM modulator 832 coupled to a QAM demodulator 834 through an ideal signal channel 836. The original baseband symbol clock signal 838 is assumed to be available to QAM demodulator 834 with neither distortion nor delay other than the addition of Additive White Gaussian Noise (AWGN). The 3 dB reduction in performance in BER curve 704 compared to the ideal baseline BER curve 702 is understandable because the four samples per symbol clock cycle assumed for these predictions implies a loss of information otherwise available by integrating out the effects of AWGN.

Figure 8C:
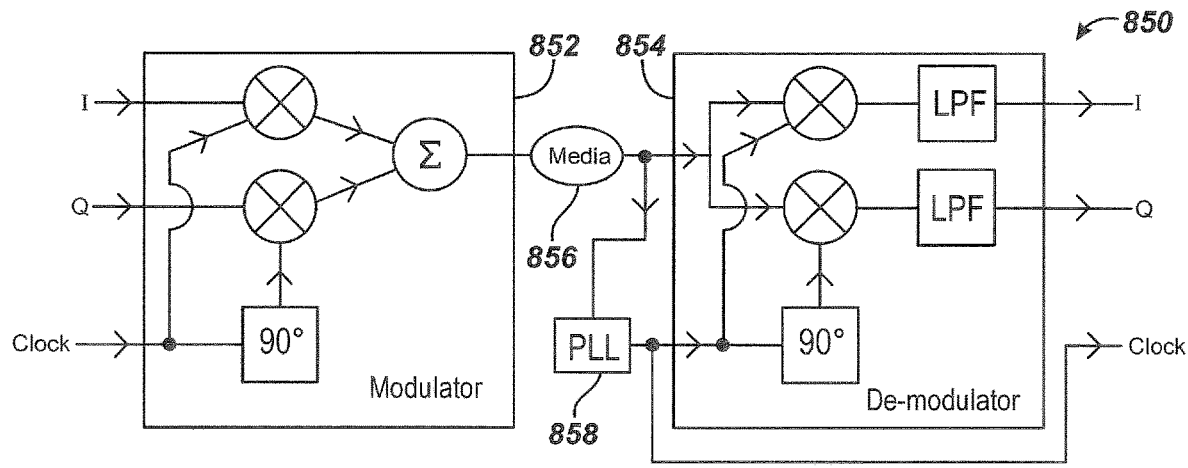
FIG. 8C is a block diagram illustrating a third embodiment of a QAM modulator and demodulator from the prior art using a cable and preamplifier channel and a Phase-Locked Loop (PLL) for demodulator baseband symbol clock recovery.

Returning to FIG. 7, the BER curve 706 provides the predicted BER of the QAM modulator and demodulator embodiment 850 shown in FIG. 8C. As shown in FIG. 8C, embodiment 850 includes a QAM modulator 852 coupled to a QAM demodulator 854 through a cable and preamplifier signal channel 856. The baseband symbol clock timing is recovered at QAM demodulator 854 by means of a simple PLL 858. The performance shown by BER curve 706 is dismal because the complete suppression of the baseband symbol clock signal from QAM modulator 852 makes the reliance on a "simple" PLL 858 for clock recovery an unrealistic solution to the clock recovery problem.

Figure 8D:
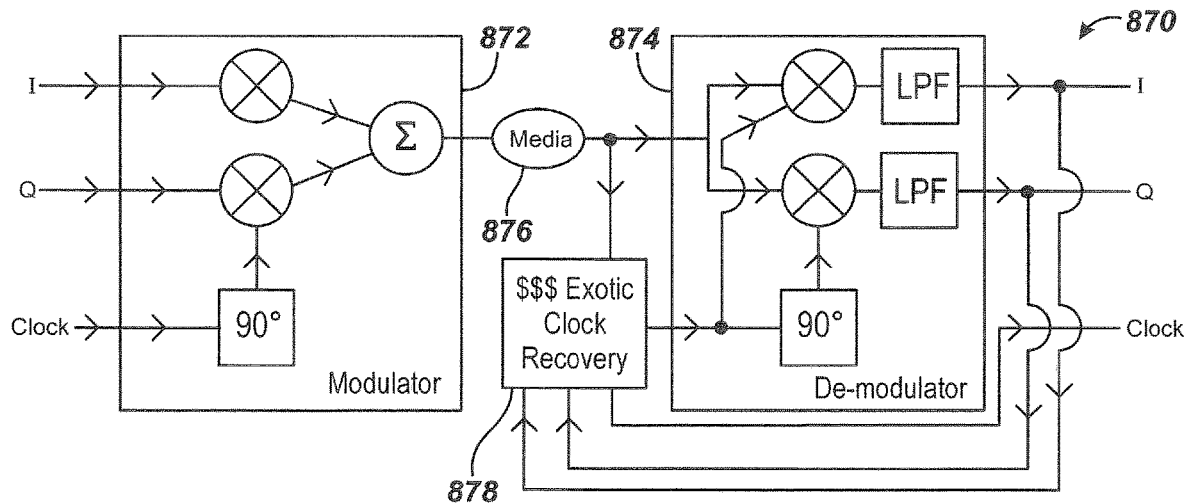
FIG. 8D is a block diagram illustrating a fourth embodiment of a QAM modulator and demodulator from the prior art using a cable and preamplifier channel and an exotic means for demodulator baseband symbol clock recovery.

In FIG. 7, the BER curve 708 provides the predicted BER of the QAM modulator and demodulator embodiment 870 shown in FIG. 8D. As shown in FIG. 8D, embodiment 870 includes a QAM modulator 872 coupled to a QAM demodulator 874 through a cable and preamplifier signal channel 876. The baseband symbol clock timing is recovered at QAM demodulator 874 by means of a complex "exotic" clock recovery means 878. By using any sufficiently sophisticated baseband symbol clock timing recovery mechanism known in the art for the exotic recovery means 878, BER curve 708 provides a performance that is no worse than BER curve 704 at higher BER values and no more than 5-6 dB worse at lower BER values. This variation between BER curves 704 and 708 is related to timing and equalization error degradation and is accepted in the art as a performance sacrifice made to avoid the undesirable performance reduction from "carrier leakage" in QAM systems (FIG. 9).

Figure 9:
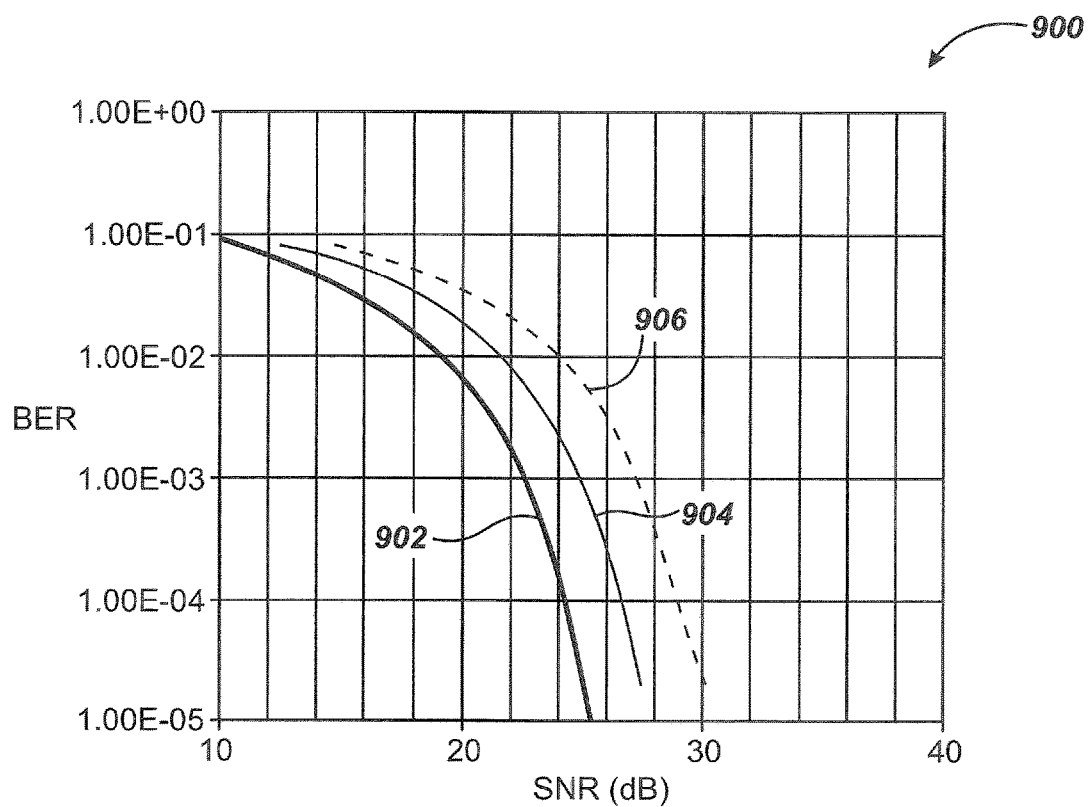
FIG. 9 is a graph illustrating the theoretical BER characteristics for several 256-QAM system embodiments of this invention.
Figure 10A:
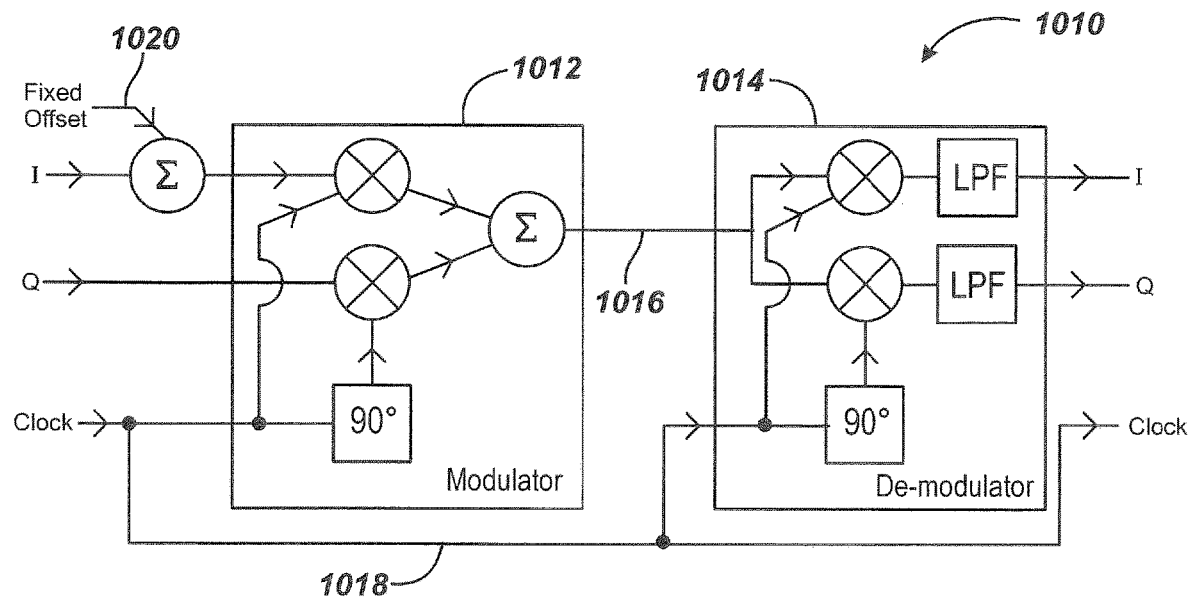
FIG. 10A is a block diagram illustrating a first embodiment of a QAM modulator and demodulator of this invention using the undistorted modulator baseband symbol clock signal at the demodulator.

The effects on BER of an asymmetric QAM constellation may be appreciated with reference to FIG. 9. FIG. 9 provides a graph 900 illustrating the theoretical BER under various operating conditions for two 256-QAM communications system embodiments using the exemplary asymmetric symbol constellations 400 and 500 discussed above (FIGS. 5A-5B). The BER curve 902 provides the predicted BER of QAM modulator and demodulator embodiment 830 discussed above (FIG. 8B) and is identical to BER curve 704 in FIG. 7. The BER curves 904 and 906 provide the predicted BER of the QAM modulator and demodulator embodiment 1010 shown in FIG. 10A under two different conditions. As shown in FIG. 10A, embodiment 1010 includes a QAM modulator 1012 coupled to a QAM demodulator 1014 through an ideal signal channel 1016. The original baseband symbol clock signal 1018 is assumed to be provided to QAM demodulator 1014 with neither distortion nor delay for the purposes of predicting BER curves 904 and 906. A baseband symbol constellation offset 1020 is provided to move the 2-D baseband symbol constellation (not shown) with respect to one of the phase plane axes and thereby insert a "power wasting" baseband symbol clock signal in accordance with the method and system of this invention. For BER curve 904, offset 1020 is set to +5.0 units to create symbol constellation 400 (FIG. 5A) and, for BER curve 906, offset 1020 is set to +8.0 units to create symbol constellation 500 (FIG. 5B).

In FIG. 9, note that offsetting the symbol amplitudes by 5.0 units along the i-axis of the phase plane (FIG. 5A) provides the BER curve 904, which shows a BER performance reduction of 2-3 dB with respect to BER curve 902. Offsetting the symbol amplitudes by another 3.0 units along the I-axis of the phase plane (FIG. 5B) provides the BER curve 906, which shows a BER performance reduction of an additional 2-3 dB with respect to BER curve 904. This "power-wasting" penalty is the well-known reason why (until now) all 2-D symbol constellations are forced into symmetry about the phase plane origin. Also, this BER performance loss is consistent with the relative root mean square (RMS) powers contained in the respective time-domain waveforms, as may be appreciated with reference to the following discussion of FIGS. 11-12.

Figure 11:
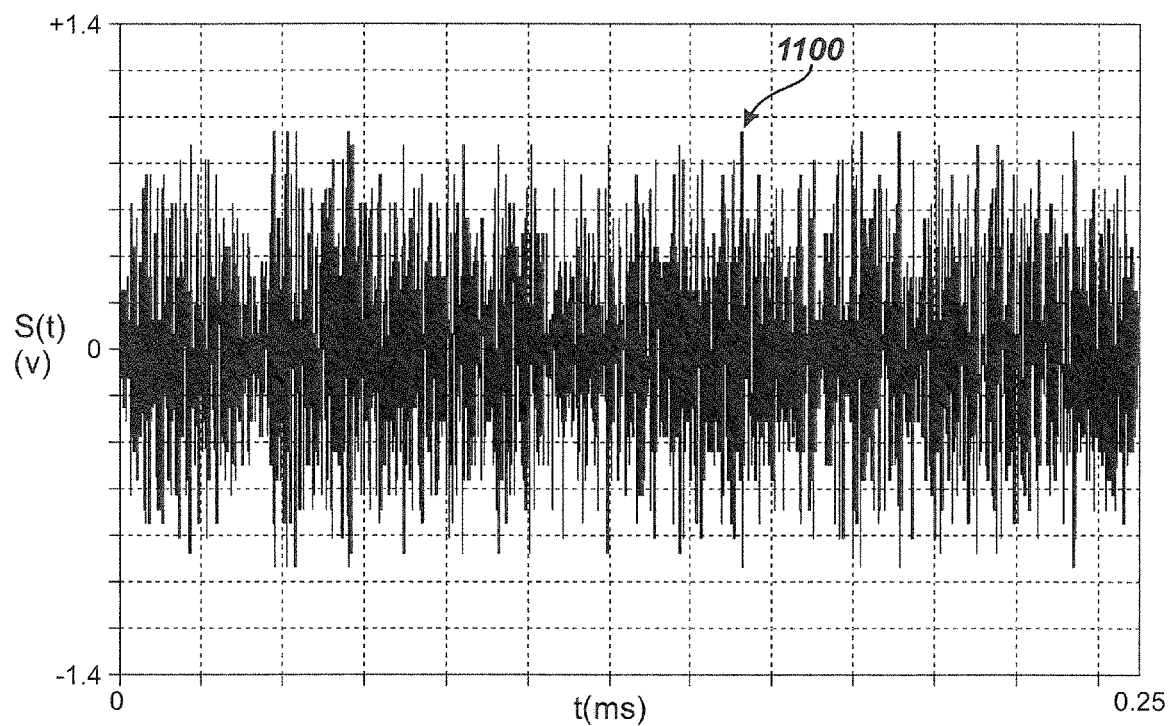
FIG. 11 is a graph illustrating the baseband transmitter output signal in the time domain from a 256-QAM system embodiment using the symmetrical Type III symbol constellation from FIG. 1.
Figure 12:
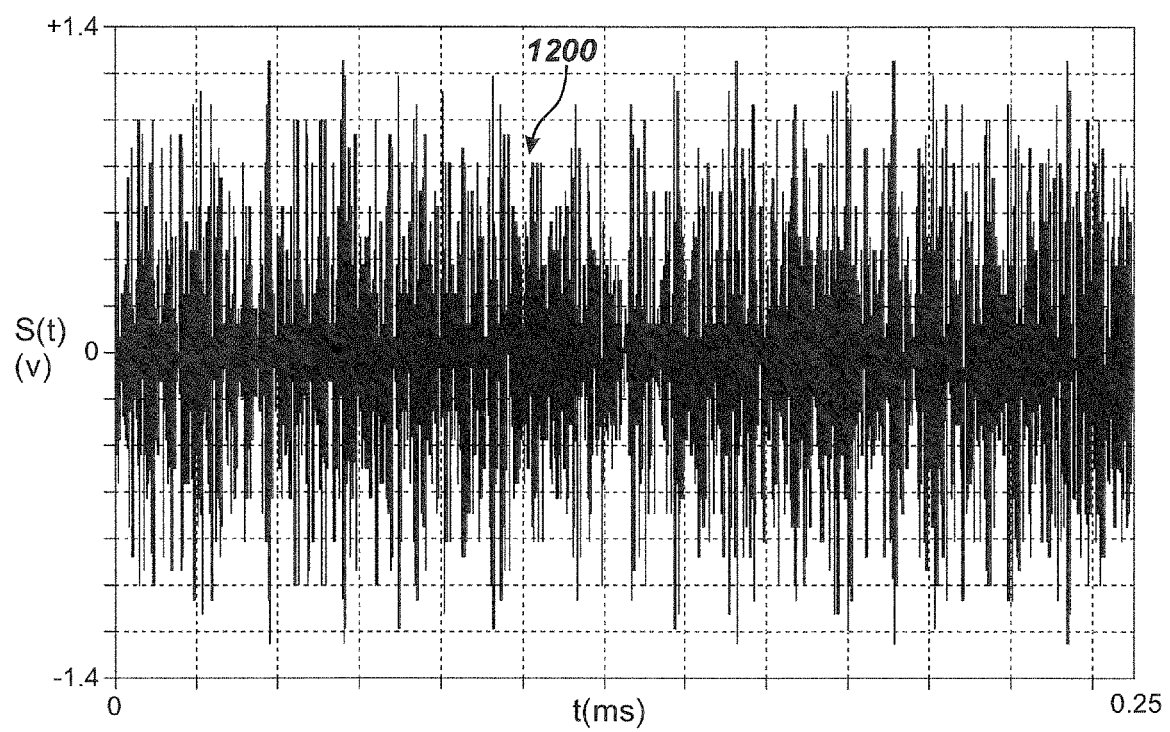
FIG. 12 is a graph illustrating the baseband transmitter output signal in the time domain from a 256-QAM system embodiment using the exemplary asymmetrical Type III symbol constellation of this invention from FIG. 5A.

FIG. 11 is a graph illustrating the baseband transmitter output signal 1100 in the time domain from 256-QAM system embodiment 200 (FIG. 3) using symmetrical symbol constellation 100 (FIG. 1). FIG. 12 is a graph illustrating the baseband transmitter output signal 1200 in the time domain from 256-QAM system embodiment 300 (FIG. 4) using asymmetrical symbol constellation 400 (FIG. 5A). Note that some additional ("wasted") RMS power is clearly evident in baseband transmitter output signal 1200 when compared with baseband transmitter output signal 1100.

Figure 13:
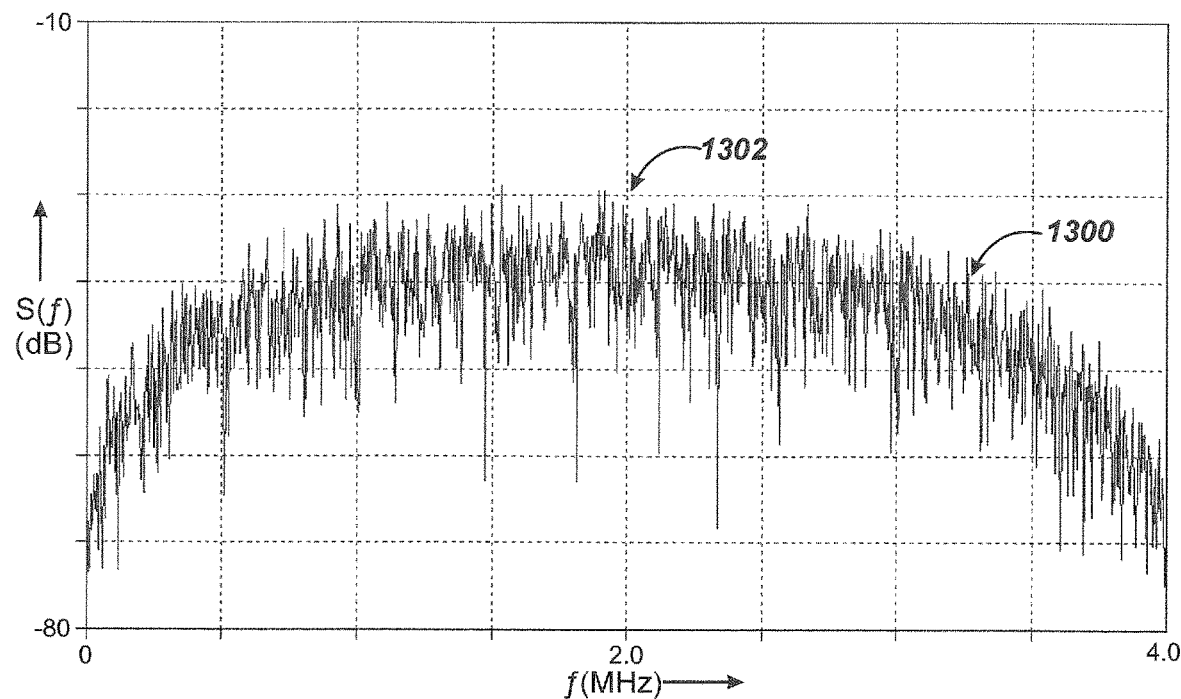
FIG. 13 is a graph illustrating the signal of FIG. 11 in the spectral domain.
Figure 14:
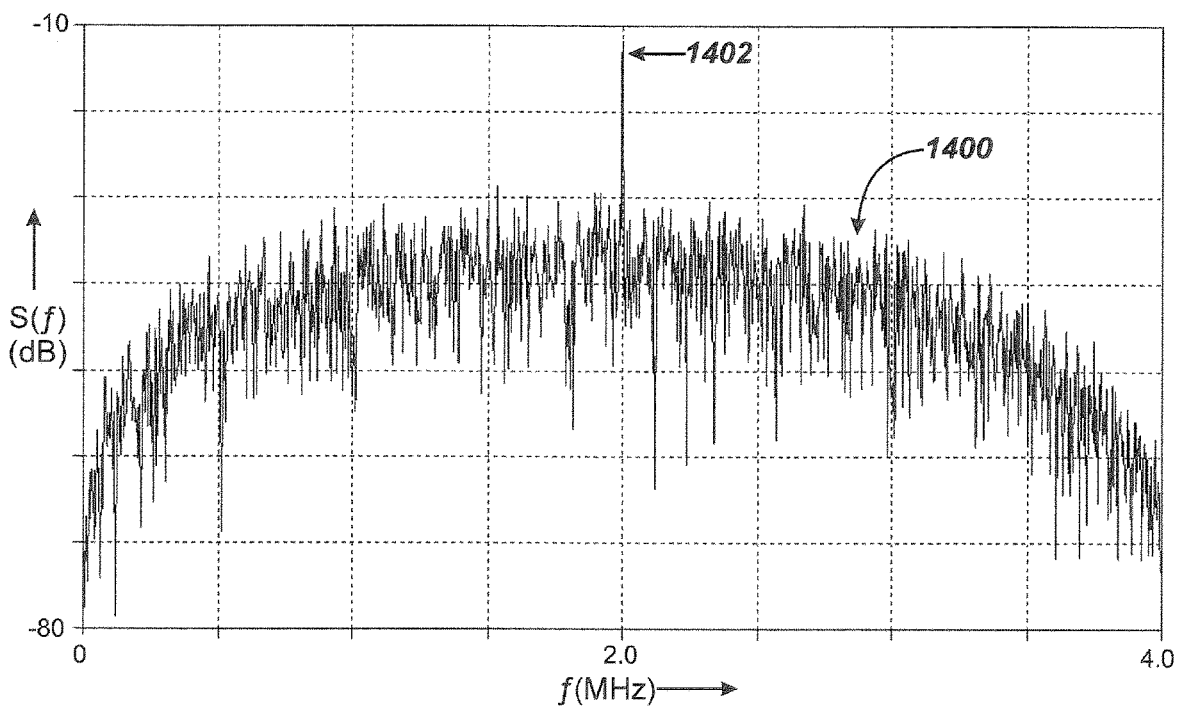
FIG. 14 is a graph illustrating the signal of FIG. 12 in the spectral domain.

But examining these same two baseband transmitter output signals 1100 and 1200 in the frequency domain provides additional useful insight into the baseband symbol clock recovery problem and the method of this invention. FIG. 13 provides a baseband transmitter output spectrum 1300 illustrating baseband transmitter output signal 1100 (FIG. 11) in the spectral domain and FIG. 14 provides a baseband transmitter output spectrum 1400 illustrating baseband transmitter output signal 1200 (FIG. 12) in the spectral domain. Even though system performance is degraded by 2 dB because of the 2 dB increase in RMS power in baseband transmitter output signal 1200 over the RMS power in baseband transmitter output signal 1100, the power at the baseband symbol clock frequency 1402 in baseband transmitter output spectrum 1400 now rises above the remainder of the spectrum by about 18 dB compared to the power at the baseband symbol clock frequency 1302 in baseband transmitter output spectrum 1300. This is more than adequate to facilitate a very simple means for symbol clock timing recovery in the manner now discussed. Note that the two baseband transmitter output spectra 1300 and 1400 are substantially identical except for the 18 dB spike at the baseband symbol clock frequency 1402 (FIG. 14).

Figure 15:
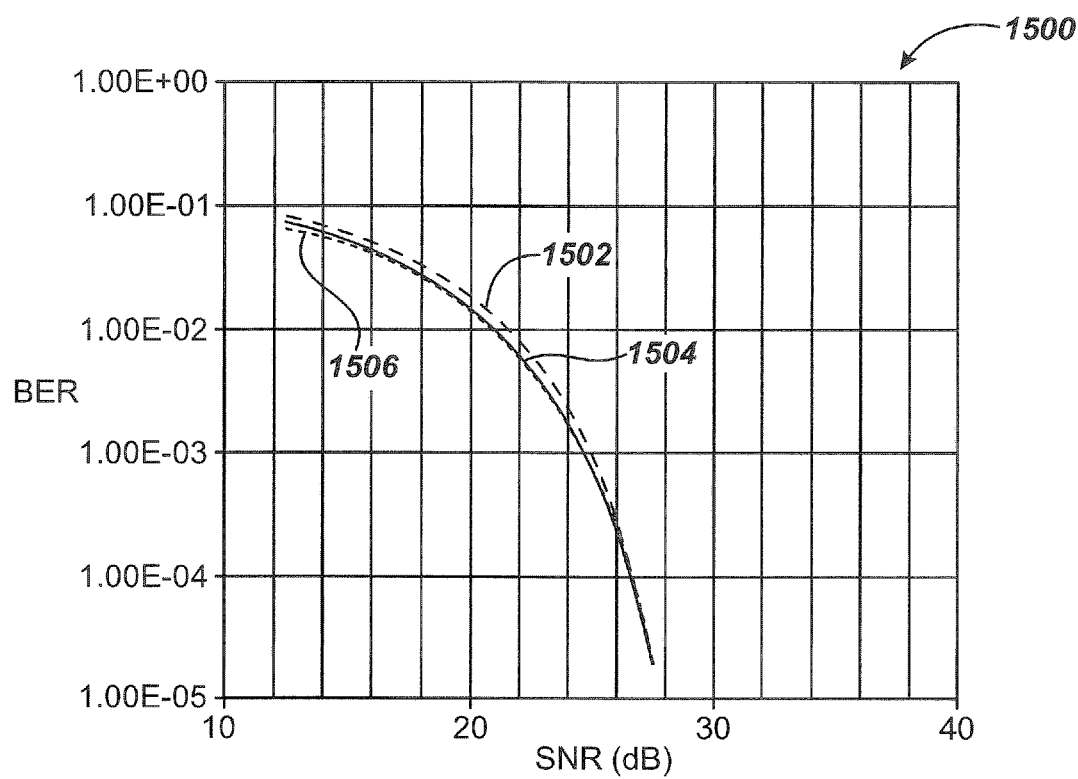
FIG. 15 is a graph illustrating the theoretical BER characteristics for several 256-QAM system embodiments of this invention.

FIG. 15 is a graph 1500 illustrating the theoretical BER under various operating conditions for 256-QAM communications system embodiments of this invention using asymmetric symbol constellation 400 (FIG. 5A). The BER curve 1502 provides the predicted BER of QAM modulator and demodulator embodiment 1010 with offset 1020 set to +5.0 units and is identical to curve 904 from FIG. 9.

Figure 10B:
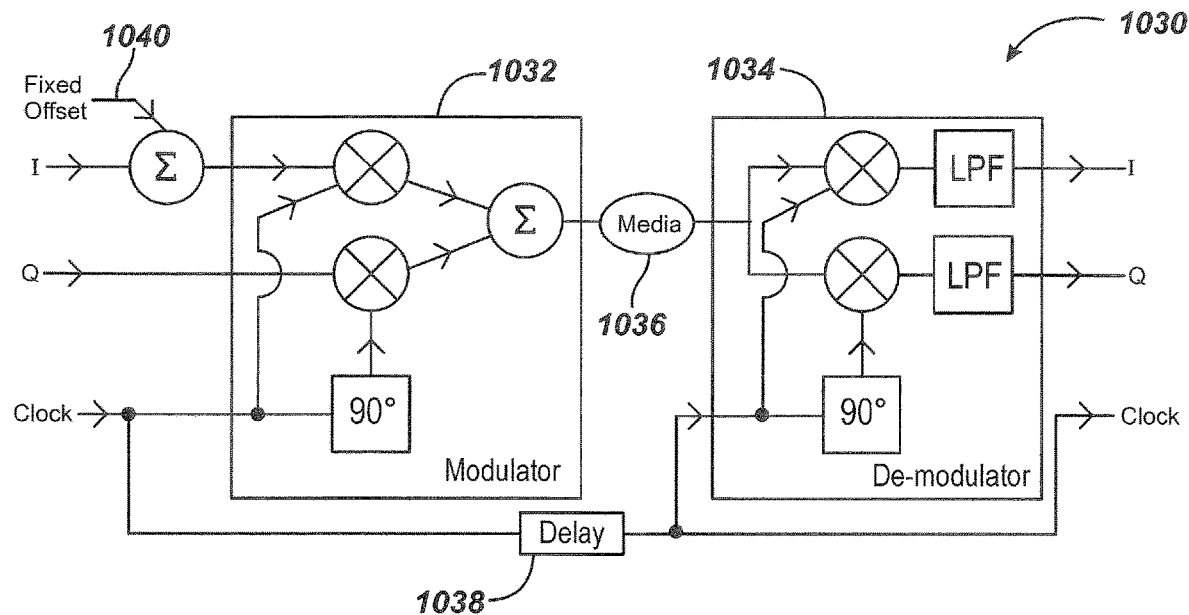
FIG. 10B is a block diagram illustrating a second embodiment of a QAM modulator and demodulator of this invention a cable and preamplifier channel and a delayed modulator baseband symbol clock signal at the demodulator.

In FIG. 15, the BER curve 1504 provides the predicted BER of the QAM modulator and demodulator embodiment 1030 shown in FIG. 10B. As shown in FIG. 10B, embodiment 1030 includes a QAM modulator 1032 coupled to a QAM demodulator 1034 through a cable and preamplifier signal channel 1036. The original baseband symbol clock signal 1038 is assumed to be provided to QAM demodulator 1034 with delay only and no distortion. The performance of BER curve 1504 is not significantly different from BER curve 1502 because the delayed but otherwise unaffected baseband symbol clock signal is also available at QAM demodulator 1034.

Figure 10C:
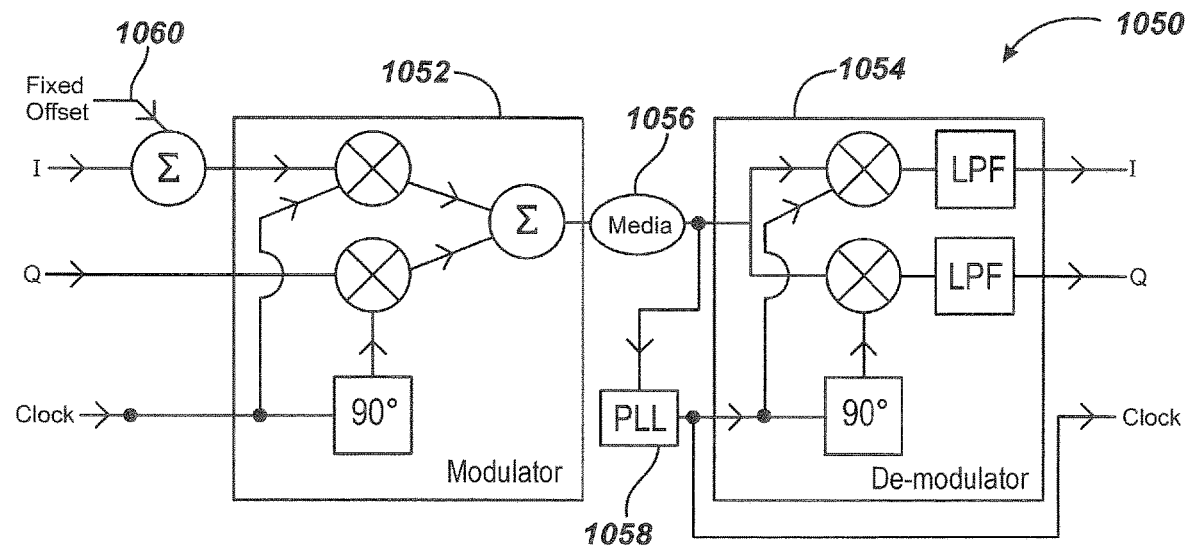
FIG. 10C is a block diagram illustrating a third embodiment of a QAM modulator and demodulator of this invention using a cable and preamplifier channel and a PLL for demodulator baseband symbol clock recovery.

In FIG. 15, the BER curve 1506 provides the predicted BER of the QAM modulator and demodulator embodiment 1050 shown in FIG. 10C and is generally indistinguishable from BER curve 1502 because of the advantageous effects of the asymmetric symbol constellation 400 (FIG. 5A) used in accordance with the method of this invention. As shown in FIG. 10C, embodiment 1050 includes a QAM modulator 1052 coupled to a QAM demodulator 1054 through a cable and preamplifier signal channel 1056. The baseband symbol clock timing is recovered at QAM demodulator 1054 by means of a simple PLL 1058. Curve 1504 BER performance is not significantly different from curve 1502 because the 18 dB spike at the baseband symbol clock frequency 1402 (FIG. 14) permits the reliance on a "simple" PLL 1058 for effective clock recovery, for the first time.

Note that the advantages of the method of this invention may be appreciated by comparing BER curve 706 (FIG. 7) to BER curve 1506 (FIG. 15). Although both examples use simple PLL baseband symbol clock recovery, the performance of BER curve 1506 demonstrates that there is no additional timing recovery penalty. Timing can be recovered without appreciable performance loss using the simple and inexpensive recovery means exemplified by PLL 1058 (FIG. 10C).

And there are additional benefits as well, including the availability of the large single frequency spike at the baseband symbol clock frequency 1402 (FIG. 14) for predicting abnormalities in signal channel 306 (FIG. 4). Referring to FIG. 4, this channel prediction capability facilitates the simplification of signal conditioner 344, which represents the only remaining element of QAM communications system 300 having any significant complexity or expense. Recall that the remainder of baseband symbol clock detector 350 and all other remaining complexity in QAM data receiver 304 are embodied within the simple and inexpensive DSP 359.

This asymmetric symbol constellation technique differs significantly from and avoids several disadvantages (e.g., increased signal envelope fluctuation and spectral spreading) of a concept for inserting a separate tone in the transmitted signal to facilitate measurement of signal channel characteristics that is sometimes denominated Transparent-Tone-In-Band (TTIB) nodulation. The TTIB concept neither considers nor suggests using a simple offset signal to shift the baseband symbol clock constellation about the phase plane as described above. TTIB requires the creation of a separate tone and insertion into the channel in the communications band. The separate tone must then be removed somehow from the received signal before attempting demodulation and decoding. This adds complexity and expense to the communications system rather than reducing complexity. The TTIB modulation may be characterized as offsetting the baseband symbol clock signal in time instead of offsetting the baseband symbol constellation in amplitude on the phase plane and results in generating overlapping sidebands, thereby altering the frequency spectrum and bandwidth of the transmitted signal. This introduces additional well-known problems that may be appreciated with reference to, for example, McGeehan et al. ["Phase-Locked Transparent Tone In Band (TIIB): A new spectrum configuration particularly suited to the transmission of data over SSB mobile radio networks," *IEEE Transactions on Communications*, vol COM32, 1984] and Hanzo et al. ["Quadrature Amplitude Modulation," Second Edition, *IEEE Press*, 2004, John Wiley].

Figure 16:
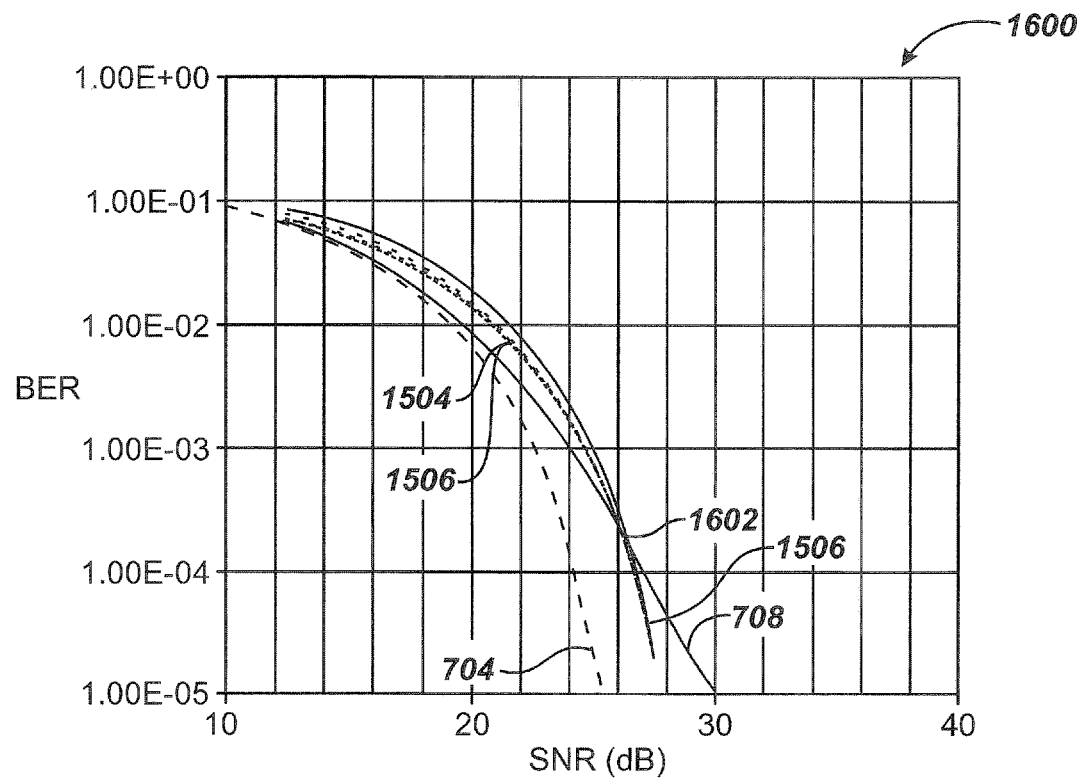
FIG. 16 is a graph comparing the theoretical BER characteristics from FIG. 15 to several BER characteristics from FIG. 7.

Finally, the utility and advantage of the method of this invention may be best appreciated with reference to FIG. 16, which is a graph 1600 comparing BER curves 704 and 708 from FIG. 15 to BER curves 1502 and 1506 from FIG. 7. Recall that BER curve 704 provides the system BER performance assuming perfect recovery of the original baseband symbol clock signal 838 at QAM demodulator 834 (FIG. 8B). And BER curve 708 provides just about the best system BER performance known in the QAM art for a real signal channel and is obtained only by using any sophisticated baseband symbol clock timing recovery mechanism known in the art for exotic recovery means 878 (FIG. 8D). Note that, compared to BER curve 708, BER curves 1502 and 1506 both show superior BER performance below the BER value represented by a crossover point 1602 (about 2E-04 to 3E-04 in this example) and falls only 1-2 dB behind BER curve 708 at the BER values well above crossover point 1602. In other words, the method and system of this invention improves BER performance over the QAM prior art in any application operating beyond crossover point 1602 (SNR=about 26 dB in this example) and does this with substantially less complexity and expense.

By offsetting the 2-D baseband symbol constellation with respect to the phase plane origin, symbol clock leakage is inserted into the transmitted QAM signal. While this slightly degrades static BER performance alone, this discussion discloses for the first time that the asymmetrical constellation actually improves overall system performance when considering baseband symbol clock recovery and received signal compensation for an imperfect signal channel. This improvement, for the first time, allows QAM to be deployed in systems where QAM is otherwise prohibitively expensive. This improvement, for the first time, also allows overall system pertem performance to be improved for any existing QAM system without additional bandwidth, cost or complexity.

A Pipe Inspection System Embodiment

Advantageously, the QAM system and method of this invention may be embodied in a video transmitter to send high definition video signal up a pipe-inspection system cable to a video receiver. This QAM video signal does not interfere with data link and other cable uses in the pipe-inspection system. For example, the QAM video signal does not use bandwidth near 32 kHz or 512 Hz, so it does not suffer from interference from the system's sonde (512 Hz) or tracer frequency (32,768 Hz). This embodiment provides performance superior to a standard NTSC signal, which is degraded by the cable, offers less picture quality, and interferes with sonde and/or tracer operation.

Figure 17:
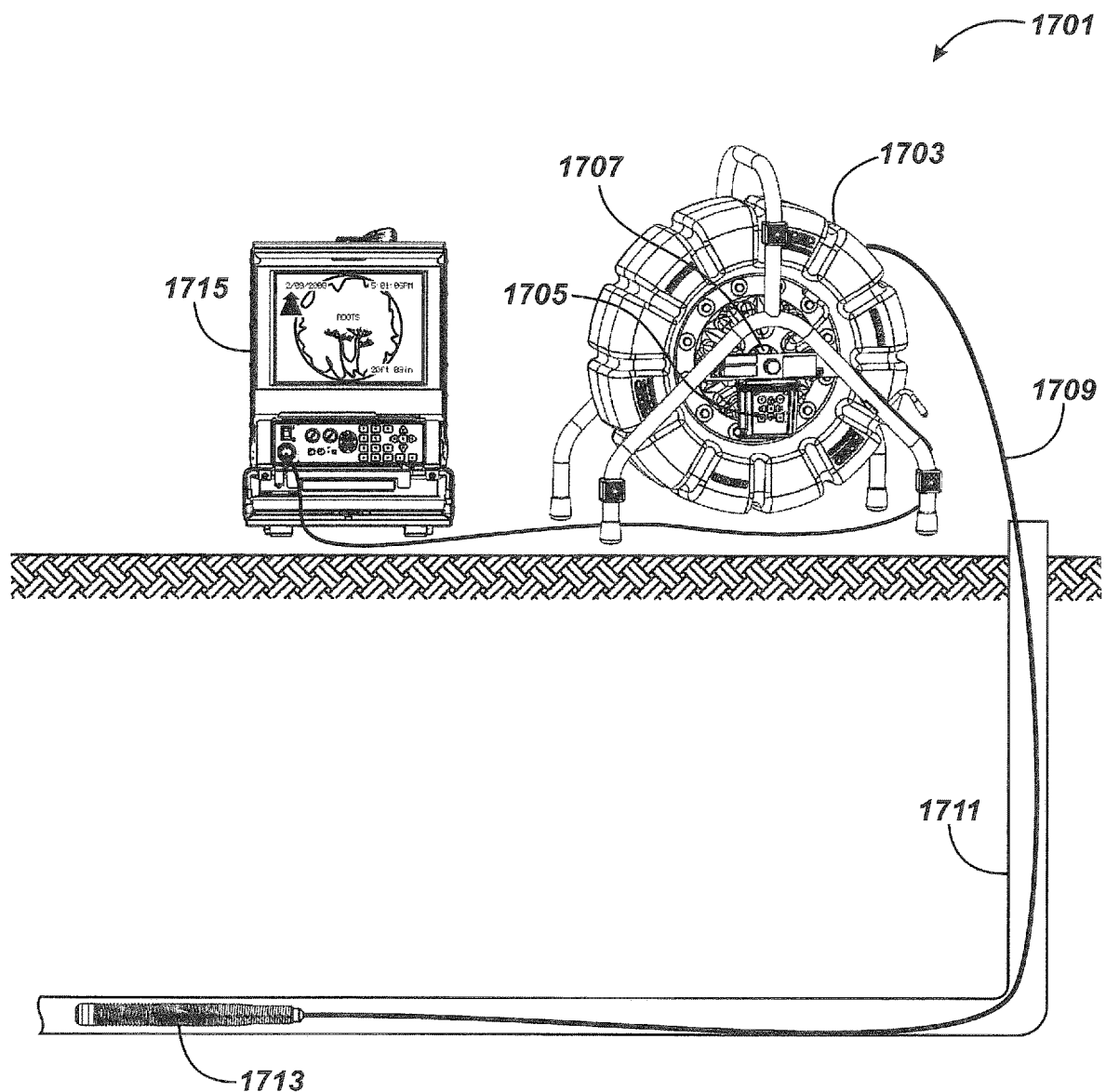
FIG. 17 is a perspective diagram illustrating an exemplary embodiment of a pipe mapping system of this invention incorporating the data transfer system of this invention.

FIG. 17 is a perspective diagram illustrating an exemplary pipe inspection system embodiment 1701 incorporating the data transfer system and method of this invention. Referring to FIG. 17, a pipe inspection system 1701 includes a camera head 1713 operatively connected to the distal end of a push-cable 1709. The proximal end of the push-cable 1709 is operatively connected to a cable-counter and user interface panel 1705 through a slip-ring assembly 1707. Examples of suitable constructions for the camera head 1713 are disclosed in U.S. Pat. No. 6,831,679 entitled "Video Camera Head with Thermal Feedback Control," granted to Mark S. Olsson et al. on Dec. 14, 2004, and in U.S. patent application Ser. No. 10/858,628 entitled "Self-Leveling Camera Head," of Mark S. Olsson filed Jun. 1, 2004, the entire disclosures of which are hereby incorporated by reference. Push-cable constructions and termination assemblies suitable for use in connecting the proximal and distal ends of a push-cable are disclosed in U.S. Pat. No. 5,939,679 entitled "Video Push Cable" granted Aug. 17, 1999 to Mark S. Olsson, U.S. Pat. No. 6,958,767 entitled "Video Pipe Inspection System Employing Non-Rotating Cable" granted Oct. 25, 2005, to Mark S. Olsson et al., U.S. patent application Ser. No. 12/371,540 filed Feb. 13, 2009 entitled "Push-Cable for Pipe Inspection System," and U.S. Patent Application Ser. No. 61/152,947 filed Feb. 16, 2009 by Mark S, Olsson et al. entitled "Pipe Inspection System with Replaceable Cable Storage Drum," the entire disclosures of which are hereby incorporated by reference. In FIG. 17, a reel 1703 holds coils of the push-cable 1709. The push-cable 1709 is paid out from reel 1703 to force camera head 1713 down pipe 1711. Examples of a suitable reel 1703 and push-cable 1709 are disclosed in the aforementioned U.S. Pat. No. 6,958,767. Within the reel 1703, a slip-ring assembly 1707 provides rotary signals to an associated circuit board (not shown) which enables them to be translated into digital measurements of distance traversed by the push-cable 1709 based on the rotation of the drum. One example of a suitable slip ring assembly is disclosed in U.S. Pat. No. 6,908,310 entitled "Slip Ring Assembly with Integral Position Encoder," granted Jun. 21, 2005, to Mark S. Olsson et al., the entire disclosure of which is hereby incorporated by reference. The camera head 1713 with its on-board circuitry transmits image information through embedded conductors such as wires in the push-cable 1709. A display unit 1715 shows the updated field of view (FOV) image from the camera head 1713 with an overlay indicating the distance down-pipe and the direction of travel based on the values transmitted from the slip ring assembly 1707. Circuit boards within the user-interface assembly 1705 provide memory and processing, user information display and input controls.

Figure 18:
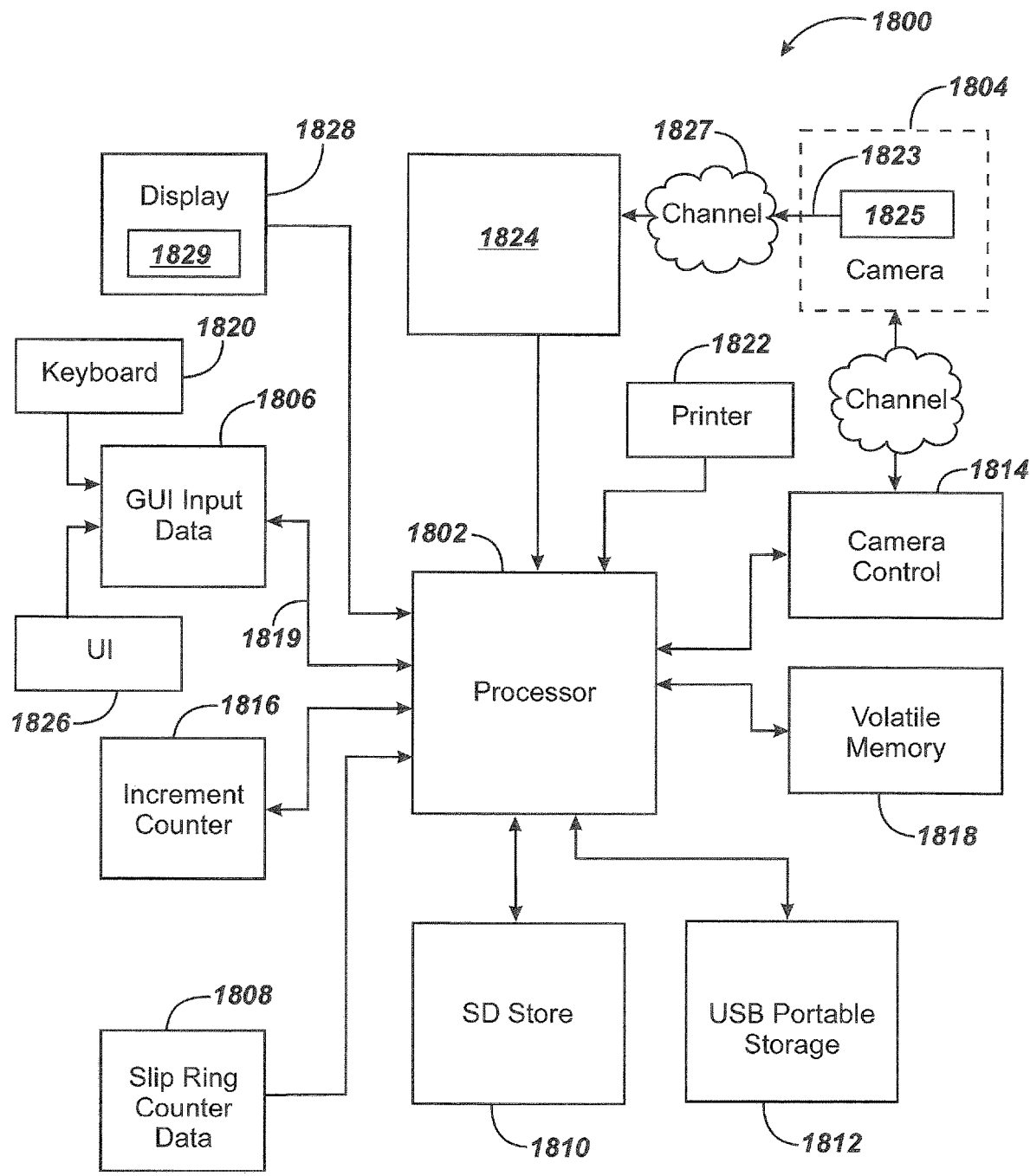
FIG. 18 is a block diagram illustrating the electronic portion of the system of FIG. 17 a method for transferring a video signal through the signal channel that processes the flow of image data, camera control data, distance counter data, user interface data, and display information.

Turning now to FIG. 18, the electronic portion 1800 of pipe inspection system 1701 includes a central processor 1802 associated with a volatile memory 1818, which receives input data 1819 from a user interface 1806, a slip-ring counter 1808, a remote video camera 1804 including a video transmitter 1825, which incorporates the elements of QAM data transmitter 302 substantially as shown in FIG. 4 and operating substantially as discussed above. Video transmitter 1825 providing a video signal 1823 representing image data passing through a signal channel 1827 to a video receiver 1824, which incorporates the elements of QAM data receiver 304 substantially as shown in Fi. 4 and operating substantially as discussed above. Signal channel 1827 is embodied as one or more electrical conductors disposed within push-cable 1709 (FIG. 17). Central processor 1802 is also associated with camera control circuitry 1814, a system graphical user interface (GU) 1826, and a keyboard 1820. The central processor 1802 sends output signals to the camera control 1814, volatile memory 1818, SD card storage 1810, USB portable (thumb drive) storage 1812, and the user GUI 1826 with its associated display 1828, which also displays images 1829 responsive to video signal 1823 arriving at video receiver 1824 upon proper user or software command. The transfer of image and other data may be automated through firmware programming or initiated from the GUI 1826 using on-board key presses, or by means of the keyboard 1820. Algorithmic options in the firmware may permit parameters such as distance interval between image captures, for example, to be set to default values in automatic operation or to be set to user selected values using menu options exercised through UI 1826 or keyboard 1820.

Figure 19:
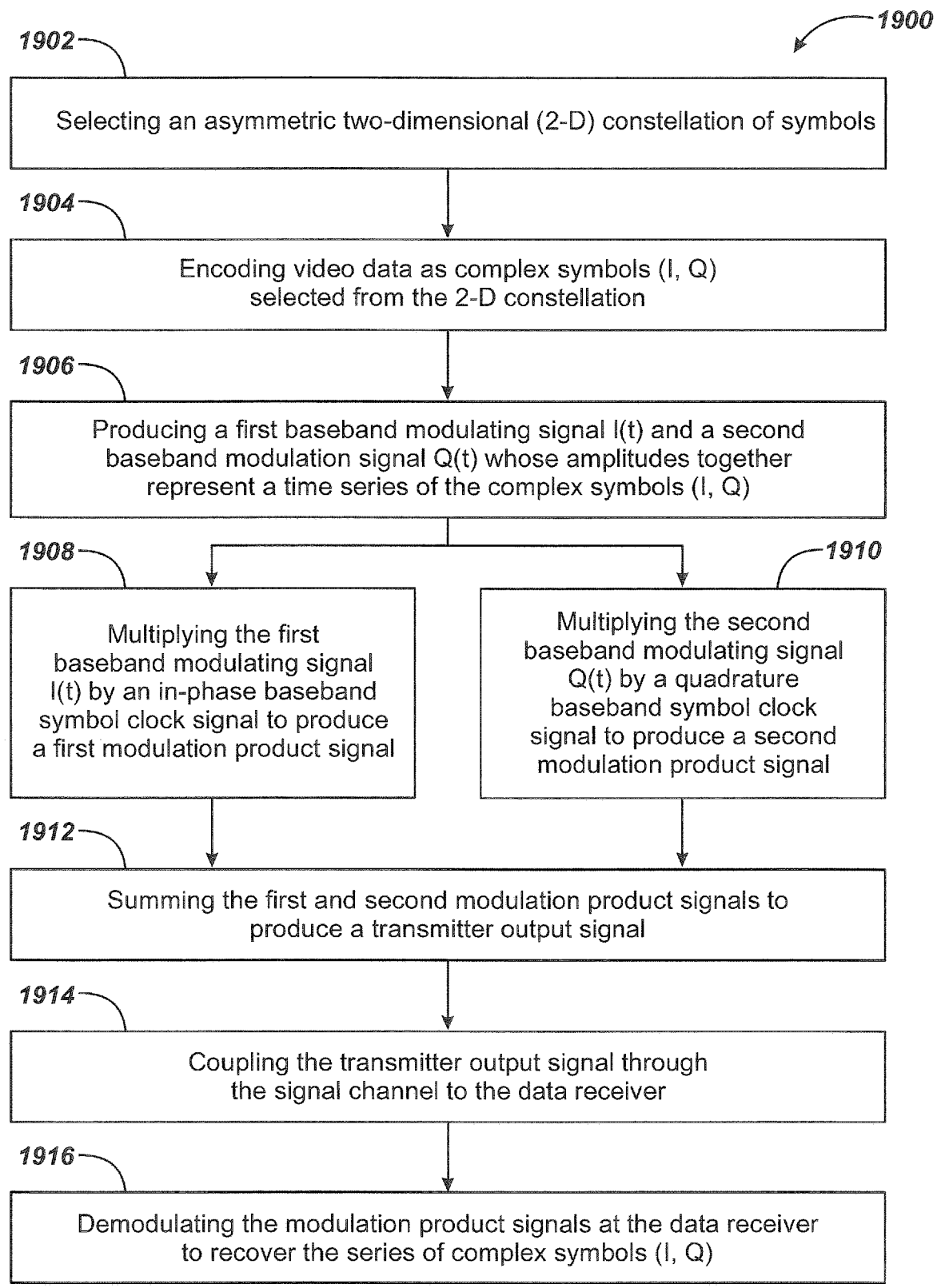
FIG. 19 is a flowchart illustrating an exemplary method of this invention for transferring a video signal through signal channel in a pipe inspection system of FIG. 17.

FIG. 19 is a flowchart illustrating an exemplary method 1900 of this invention for transferring video signal 1823 through signal channel 1827 in electronic portion 1800 of pipe inspection system 1701. Method 1900 begins at the step 1902 by first selecting a two-dimensional (2-D) constellation of symbols distributed on the phase plane asymmetrically about the origin, such as constellation 400 or constellation 500 discussed above in connection with FIGS. 5A-B, for example. Next, at the step 1904, the video signal data are encoded as complex symbols (I, Q) selected from the 2-D constellation, and, in the step 1906, first and second baseband modulating signals I(t) and Q(t) are produced, whose amplitudes together represent the time series of complex symbols (I, Q) and at least one of the baseband modulating signals has a substantially non-zero mean amplitude. Then, in the step 1908, the first baseband modulating signal $1(t)$ is multiplied by an in-phase baseband symbol clock signal to produce a first modulation product signal as, in the step 1910, the second baseband modulating signal Q(t) is multiplied by a quadrature baseband symbol clock signal to produce a second modulation product signal. In the step 1912, the first and second modulation product signals are summed to produce a transmitter output signal, which is coupled through the signal channel to the data receiver in the step 1914. Finally, in the step 1916, the two modulation product signals are demodulated at the data receiver to recover the series of complex symbols (I, Q), thereby facilitating recovery of the video signal data (not shown).

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A remote video inspection system digital data receiver, comprising:
   a QAM video receiver module including:
   a video signal input coupled to a signal channel for producing a receiver input signal responsive to a received two dimensional QAM transmitter output signal from a corresponding QAM transmitter via a wired communications channel, wherein the QAM transmitter output signal is encoded with a QAM signal having a square symbol constellation disposed asymmetrically about one of two phase plane axes of the constellation;

a QAM demodulator coupled to the video signal input for recovering a symbol clock and using the recovered symbol clock for recovering the video data from the receiver input signal; and a non-transitory memory for storing the video data.

2. The receiver of claim 1, further including a video display coupled to the QAM demodulator for producing images responsive to the video data.

3. The receiver of claim 2, wherein the QAM transmitter output signal is encoded with a QAM signal having a baseband modulating signal with quadrature components in a symbol constellation distributed about the origin of the QAM phase plane such that at least one of the in-phase or quadrature signals has a substantially non-zero mean amplitude.

4. The receiver of claim 3, wherein the QAM signal has a square symbol constellation disposed asymmetrically about one of the two phase plane axes of the constellation.

5. The receiver of claim 3, wherein the QAM signal has a rectangular symbol constellation disposed asymmetrically about one of the two phase plane axes of the constellation.

6. The receiver of claim 3, wherein the QAM signal has a square symbol constellation disposed asymmetrically about both of the two phase plane axes of the constellation.

7. The receiver of claim 3, wherein the QAM signal has a rectangular symbol constellation disposed asymmetrically about both of the two phase plane axes of the constellation.

8. The receiver of claim 3, wherein the demodulator:
recovers a clock signal from the modulated signal;
demodulates the received modulated signal; and
provides an output data stream corresponding to an encoded data stream provided to the QAM transmitter, wherein the encoded data stream includes the video data.

9. The receiver of claim 3, wherein the video signal is generated in a digital pipe inspection camera operatively coupled to the QAM transmitter, the wired communications channel is disposed in a push-cable, and the output display is provided in a camera control unit (CCU) or other video display operatively coupled to an output of the receiver.

* * * * *